United States Patent
Kadohara et al.

(10) Patent No.: US 6,577,344 B2
(45) Date of Patent: Jun. 10, 2003

(54) FOCUS STATE DETECTION APPARATUS WITH IMAGE SENSING DEVICE CONTROLS

(75) Inventors: Terutake Kadohara, Yokohama (JP); Keiji Ohtaka, Yokohama (JP); Yasuo Suda, Yokohama (JP); Keiji Nagata, Yokohama (JP); Kenichiro Yamashita, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/935,856

(22) Filed: Sep. 23, 1997

(65) Prior Publication Data

US 2002/0003582 A1 Jan. 10, 2002

(30) Foreign Application Priority Data

Sep. 27, 1996 (JP) ............................... 8-256288
Sep. 27, 1996 (JP) ............................... 8-256289
Sep. 27, 1996 (JP) ............................... 8-256290

(51) Int. Cl.[7] ............................... H04N 5/232
(52) U.S. Cl. ............................ 348/350; 396/121
(58) Field of Search ............................ 348/345, 349, 348/350, 353; 250/201.8, 201.2, 201.7, 208.1; 396/121, 123, 122; H04N 5/232

(56) References Cited

U.S. PATENT DOCUMENTS 5,218,395 A * 6/1993 Taniguchi et al. .......... 348/350
5,241,167 A    8/1993 Suzuki et al.
5,428,420 A * 6/1995 Akashi et al. .............. 396/111
6,069,349 A * 5/2000 Akamatsu et al. ......... 250/201.8

FOREIGN PATENT DOCUMENTS

| EP | 02001697 | 1/1990 | .......... H04N/5/335 |
| EP | 03053210 | 7/1991 | ............ G02B/7/36 |
| EP | 04316007 | 11/1992 | ............ G02B/7/36 |
| EP | 0 667 546 A2 | 8/1995 | ............ G02B/7/08 |
| EP | 0 782 026 A2 | 7/1997 | ............ G02B/7/28 |

OTHER PUBLICATIONS

European Search Report for corresponding European Application 97307561.7 (Oct. 26, 1998).

* cited by examiner

Primary Examiner—Tuan Ho
(74) Attorney, Agent, or Firm—Morgan & Finnegan, L.L.P.

(57) ABSTRACT

A focus state detection apparatus for detecting focus state on the basis of signals outputted from a pair of area sensors each of which is configured in two dimension in accordance with an image of an object passing through an optical system and formed on the pair of area sensors. Each of the pair of area sensors is divided into a plurality of areas each of which can be controlled independently, and charging pixels of the area sensors is controlled by each pair of corresponding divided areas of the area sensors.

59 Claims, 37 Drawing Sheets h < v h > v

FIRST IMAGE

SECOND IMAGE

*(PRIOR ART)*
FIG.42
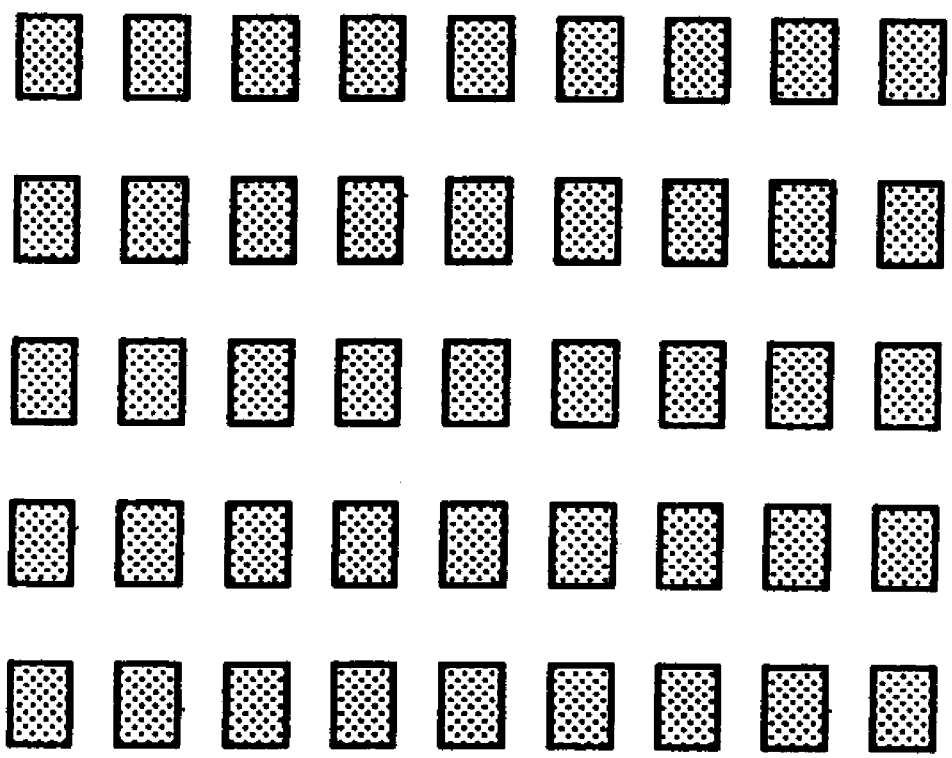
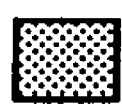 DETECTION CENTER

▨ DETECTION CENTER

J

I $V_P$   H

G

FOCUS STATE DETECTION APPARATUS WITH IMAGE SENSING DEVICE CONTROLS

BACKGROUND OF THE INVENTION

The present invention relates to a focus state detection apparatus used in an image sensing apparatus, such as a still camera and a video camera, and various kinds of observation apparatuses and, more particularly, to a focus state detection apparatus which performs focus state detection by using area sensors configured with two-dimensional solid-state image sensing devices, such as CCDs, capable of sensing an complete image.

FIG. 31 is a view illustrating a brief optical configuration of a camera including a conventional focus detection unit. In FIG. 31, reference numeral 101 denotes an object lens which introduces an image of an object (referred as "object image", hereinafter) into the apparatus; 102, a main mirror (half mirror) which is half transparent and reflects a part of light of the object image incoming through the object lens 101; 103, a reticle which is placed at a focal plane of the object lens 101; 104, a pentagonal prism which changes the traveling direction of light; 105, an eyepiece; 106, sub-mirror which operates when performing focus state detection; 107, a film, such as a silver halide film; and 108, a focus state detection unit.

Referring to FIG. 31, light from an object (not shown) passes through the object lens 101, then a part of the light is reflected by the main mirror 102 upward, and the reflected light forms an image on the reticle 103. The image formed on the reticle 103 is further reflected in the pentagonal prism 104 a plurality of times, and eventually reaches the eye of a user through the eyepiece 105. Further, the light which passes through the main mirror 102 reaches the film 107 and exposes it with the object image thereby obtaining a desired image.

Meanwhile, a part of the flux of light which passed through the main mirror 102 is reflected by the sub-mirror 106 downward, and led to the focus state detection unit 108.

FIG. 32 is a view for explaining the principle of focus state detection in relation to the object lens 101 and the focus state detection unit 108 shown in FIG. 31.

In the focus state detection unit 108 shown in FIG. 32, reference numeral 109 denotes a field stop provided near the desired focal plane, i.e., a conjugate plane of a plane where the film 107 is supplied; 110, a field lens arranged near the desired focal plane; 111, a secondary lens system having two lenses 111-1 and 111-2; 112, a photoelectric conversion device including two line sensors 112-1 and 112-2 provided behind the lenses 111-1 and 111-2, respectively; 113, an iris diaphragm having two aperture openings 113-1 and 113-2 corresponding to the lenses 111-1 and 111-2 of the secondary lens system 111, respectively; and 114, an exit pupil of the object lens 101. Note, the field lens 110 has power for forming an image of the aperture openings 113-1 and 113-2 of the iris diaphragm 113 in near areas 114-1 and 114-2 of the exit pupil 114 of the object lens 101. In reverse, fluxes of light 115-1 and 115-2 which passed through the areas 114-1 and 114-2 further pass through the aperture openings 113-1 and 113-2, respectively, and incident on the two line sensors 112-1 and 112-2, thereby distributions of quantity of light are obtained by the two line sensors 112-1 and 112-2.

The focus state detection unit 108 shown in FIG. 32 adopts a so-called phase-difference detection method. When the focal point of the object lens 101 is in front of the desired focal plane, namely when an image is focused ahead of the desired focal plane, the images obtained by the two line sensors 112-1 and 112-2 approaches each other. In opposite, when the focal point of the object lens 101 is behind the desired focal plane, the images obtained by the two line sensors 112-1 and 112-2 recedes from each other. Since the shifted amount between the distributions of quantity of light of the two line sensors 112-1 and 112-2 has a predetermined functional relationship to a defocus amount of the object lens 101, by calculating the shifted amount between the distributions in accordance with proper operation, it is possible to obtain defocus direction and amount. The object lens 101 is moved in accordance with the defocus direction and amount so that the defocus amount approaches 0. When the defocus amount becomes substantially 0, the focus state detection is finished.

In the camera including the conventional focus state detection unit 108 as shown in FIG. 32, an area used for the focus state detection (referred as "detection area", hereinafter) is a strip and narrow as an area B with respect to an sensed image area A as shown in FIG. 33. The size and shape of the detection area B is determined by the shape of the line sensors 112-1 and 112-2, shown in FIG. 32, used in the focus state detection.

FIG. 34 is a block diagram showing a brief mechanism for charge control of the line sensors 112-1 and 112-2. Referring to FIG. 34, an output VD, commonly used as a reference for the line sensors 112-1 and 112-2, of a light-blocked pixel 120 (the pixel is referred as "dark pixel" and the output is referred as "dark voltage", hereinafter), and an output VP from a maximum voltage detection circuit 121 connected to the line sensors 112-1 and 112-2, namely the maximum voltage of the line sensors 112-1 and 112-2, are inputted to a differential amplifier 122. Then, the difference between the dark voltage VD and the maximum voltage VP is obtained and outputted. Charging of the line sensors 112-1 and 112-2 continues until the difference reaches a predetermined level VR, and when the difference reaches the predetermined level VR, charging of the line sensors 112-1 and 112-2 is terminated and a signal φR which is an end-charging signal for transferring the stored charges from pixels to charge capacitors is sent to the line sensors 112-1 and 112-2. The reason for taking a difference between the maximum voltage VP and the dark voltage VD is that, by charging the line sensors 112-1 and 112-2 until the difference between the maximum voltage VP and the dark voltage VD reaches the predetermined level VR, it is possible to obtain the phase difference between the distributions of quantity of light for focus state detection in sufficient precision. Further, if charging is continued after the difference reaches the predetermined level, there is a possibility that the pixels of the line sensors 112-1 and 112-2 saturate, which may cause improper focus state detection. Therefore, when "VP−VD=VR" is satisfied, the end-charging signal φR is outputted to the line sensors 112-1 and 112-2.

FIGS. 35A and 35B are graphs showing image signals (distributions of quantity of light) from the line sensors 112-1 and 112-2 with reference to the dark voltage VD of the dark pixel 120, and the maximum voltage VP of first and second images (in FIGS. 35A and 35B, the maximum voltage VP is in the first image), corresponding to the line sensors 112-1 and 112-2, respectively, is the predetermined level VR. For using the signals from the line sensors 112-1 and 112-2 for focus state detection, when the difference between a voltage of any pixel of the line sensors 112-1 and 112-2 and the dark voltage VD reaches the predetermined level VR, charging is terminated and whether or not an image is focused is determined on the basis of output images.

FIG. 36 is a circuit diagram showing a brief configuration of the maximum voltage detection circuit 121 and its subsequent circuits, namely the differential amplifier 122 and a part of a charge controller 123 both shown in FIG. 34. In FIG. 36, only two sets of circuits for outputs Vn and Vn−1 outputted from n-th and (n−1)-th pixels, respectively, are connected to a wire 136, however, the same number of similar circuits as that of pixels included in the line sensors 112-1 and 112-2 are actually connected to the wire 136. Each pixel output is compared to the current maximum voltage VP, and when an pixel output Vn of the n-th pixel exceeds the current maximum voltage VP, an output from a differential amplifier 130 n is reversed and a MOS switch 132 n turns ON. Accordingly, the pixel output Vn is outputted through a voltage follower 131 n to the wire 136, thereby the pixel output Vn becomes the new maximum voltage VP. The maximum voltage VP of the line sensors 112-1 and 112-2 outputted from the maximum voltage detection circuit 121 enters the differential amplifier 122, where the difference between the maximum voltage VP and the dark output VD is obtained and amplified. Further, the output from the differential amplifier 122 is compared with the predetermined level VR by a comparator 134, and when the output from the differential amplifier 122 exceeds the predetermined level VR, then the end-charging signal φR is outputted thereby the charging is terminated. Thereafter, a signal φRESET is applied to a gate 135 to ground the wire 136, thereby resetting the wire 136 for preparing for the next charge control.

FIG. 37 shows an example of expanded detection areas B to be used for the focus state detection. There are three detection areas B' used for the focus state detection in the sensed image area A. The detection areas B' in FIG. 37 are obtained by adding three more stripe areas which run in the direction perpendicular to the area B shown in FIG. 33.

FIG. 38 shows an example of an arrangement of line sensors corresponding to the areas B' shown in FIG. 37. When the areas B' are as shown in FIG. 37, a photoelectric conversion element including plural pairs of line sensors C to F (referred as "line sensor pairs", hereinafter), shown in FIG. 38, and a corresponding lens system (not shown) are provided.

Further, as for the charge control of the plural line sensor pairs C to F, peripheral circuits, such as the one shown in FIG. 34, and a plurality of charge controllers 149 to 152 are provided for respective line sensor pairs C to F in order to control by pair, as shown in FIG. 39. Referring to FIG. 39, differential amplifiers 145 to 148 take differences between dark voltages VD1 to VD4 of the line sensor pairs C to F and maximum voltages VP1 to VP4 outputted from maximum voltage detection circuits 141 to 144, respectively, the differences are compared to the predetermined level VR by charge controller 149 to 152. When a difference exceeds the predetermined level VR, corresponding one out of the end-charging signals φR1 to φR4 is outputted in order to terminate charging all the pixels included in the corresponding one of the line sensor pairs C to F. After each line sensor pairs finishes charging, charges are outputted from all the pixels of the each line sensor pairs as image signals via a signal line (not shown), then, a defocus amount is detected on the basis of the image signals.

The above is the description of the focus state detection unit using strip sensors, i.e., line sensors. The detection area or areas correspond to photo-reception areas of the line sensors, therefore, the shape of the detection area or areas is limited to a line, a plurality of lines, or a combination thereof.

Accordingly, if further expansion of the detection area is directed, a photoelectric conversion unit having photo-reception areas extending in two dimensions are needed.

FIG. 40 shows a detection area B" with respect to the sensed image area A in the focus state detection unit using area sensors. As seen from FIG. 40, the detection area B" is extended greatly compared to the areas B and B' shown in FIGS. 33 and 37. If the phase-difference detection method is adopted, the photoelectric conversion unit has two two-dimensional photo reception areas, namely, a pair of area sensors (referred as "area sensor pair", hereinafter) 160-1 and 160-2 as shown in FIG. 41. By dividing photo reception areas of the area sensor pair 160-1 and 160-2 into a plurality of areas (called "divided areas", hereinafter) and detecting a phase difference by each divided area pair, focus state detection can be performed in two dimensional area.

However, there is a problem on relationship between detection precision and the number of pixels. More specifically, when the photo reception areas are divided into many areas for making the best use of the expanded photo reception areas of the area sensors, the number of pixels included in each area decreases, which may result in unsatisfactory precision of detected focus state. In contrast, when the photo reception areas are divided so that each detection area includes the sufficient number of pixels, detection centers (central portions of the respective divided areas) are separated by considerable intervals from each other. In this case, the focus state detection unit may not have good operability since the detection centers are scattered in the photo reception areas.

More specifically, a problem due to the number of each detection area is substantially solved if the divided areas are set so as to obtain an arrangement of detection centers as shown in FIG. 42 (i.e., five detection centers in the vertical direction and nine detection centers in the horizontal direction) in the detection area B", namely, in each of area sensors 160-1 and 160-2. However, if the photo reception areas are divided in this manner (five divided areas in the vertical direction, as shown in FIG. 43A), the number of pixels included in each area is small. It is possible to increase the number of pixels by decreasing the size of each pixel, however, another problem for realizing high efficient photoelectric conversion with narrower aperture openings of down-sized pixels arises.

Further, in cases shown in FIG. 43B (three divided areas in the vertical direction) and in FIG. 43C (two divided areas in the vertical direction), sufficient precision in focus state detection can be achieved for each divided area, however, the number of the detection centers is not satisfactory. It is possible to use both of these two types of divisions when performing focus state detection. In such case, in order to obtain optimized image signals in each divided area, charging operation has to be performed twice in each division state.

Regarding charge control of the area sensors 160-1 and 160-2, they are collectively controlled by a maximum voltage detection circuit 161 (see FIG. 44) using the common dark voltage VD, a differential amplifier 162, and a charge controller 163.

For the sake of simple explanation, it is assumed that an image corresponding to an image signal Y, as shown in FIG. 45, used for focus state detection is formed on an area sensor 160-1 or 160-2, and the area sensor 160-1 or 160-2 is divided into four areas, G to J.

FIGS. 46A to 46D are graphs of image signals obtained in the four areas G to J, respectively, which are shown in FIG. 45. As seen from the graphs, since the area sensors are collectively controlled, charge stored in the area H which includes a pixel charged to the maximum level in the area sensor 160-1 or 160-2 is in ideal level, however, charge stored in the other areas G, I and J are not in ideal levels. In this case, although the detection area is extended, an area to be used for focus state detection is not extended, which wastes an advantage of using area sensors.

Further, in an image sensing apparatus using line sensors, variation in focus state detection precision due to a way an image is formed on the line sensors (so called "phase-in and phase-out" problem) has been a problem. This problem remains even when area sensors are used.

Furthermore, the phase-in/phase-out problem is more serious when the object image is formed on the area sensor pair, since the distortion of the object image becomes heavy when it extends in two dimensions. As a specific problem, there is a gap between an image inside of a marked area, showing an image portion expectedly used for the focus state detection, seen from a finder and an image portion actually used for focus state detection. In this case, the image may be focused on an undesired portion which does not include the object. In order to reduce the distortion of the image, optical members for optically correcting the distortion of the image are required. However, it is technically difficult to design such the optical members and the configuration of an apparatus becomes very complicated. Thus, to correct the distortion of an image is not easy.

SUMMARY OF THE INVENTION

The present invention has been made in consideration of the above situation, and has as its object to provide a small inexpensive focus state detection apparatus capable of independently controlling each of a plurality of divided areas of area sensors and focusing on an object at an arbitrary position in an image frame at high precision.

According to the present invention, the foregoing object is attained by providing a focus state detection apparatus which detects focus state of an object on the basis of signals obtained from light flux from the object passed through an optical system, the apparatus comprising: a pair of image sensing devices each of which extends in two dimensions and is divided into a plurality of areas each of which is controlled independently; control means for independently controlling charging of each pair of the corresponding divided areas of the pair of image sensing devices; and detection means for detecting focus state on the basis of signals outputted from each pair of divided areas of the pair of image sensing devices after charging of the pair of divided areas is finished under control of the control means.

Further, it is another object of the present invention to provide a focus state detection apparatus, which performs focus state detection on any position in a continuous two-dimensional sensed or observation image, capable of improving unevenness in detected result of focus state, caused by distortion of an object image on the photoelectric conversion devices (so-called phase-in/phase-out problem).

According to the present invention, the foregoing object is attained by providing a focus state detection apparatus which detects focus state of an object on the basis of signals obtained from light flux from the object passed through an optical system, the apparatus comprising: a pair of image sensing devices each of which extends in two dimensions and is divided into a plurality of areas each of which is controlled independently; control means for independently controlling charging of each pair of the corresponding divided areas of the pair of image sensing devices; and detection means for detecting focus state on the basis of signals outputted from each pair of divided areas of the pair of image sensing devices after charging of the pair of divided areas is finished under control of the control means, wherein the pair of image sensing devices are designed so as to compensate for distortion of an image of the object caused by the optical system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 42 is a view showing a distribution of detection centers according to the prior art;

DETAILED DESCRIPTION OF THE PREFERRED EMBODIMENTS

Preferred embodiments of the present invention will be described in detail in accordance with the accompanying drawings.

First Embodiment

Figure 1:
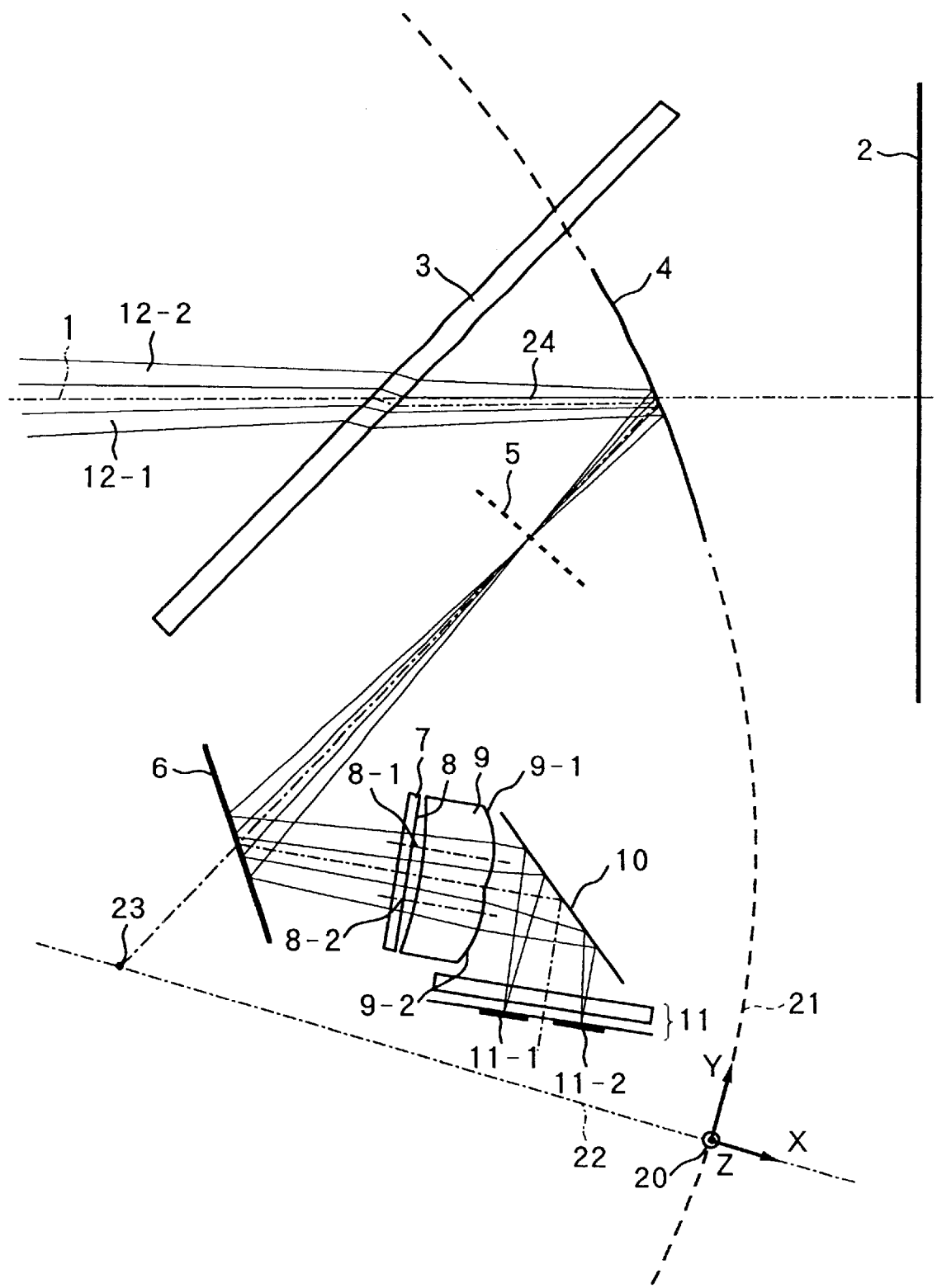
FIG. 1 is a view showing an optical path for performing focus state detection according to a first embodiment of the present invention.

FIG. 1 is a view showing an optical path for performing focus state detection according to a first embodiment. In FIG. 1, reference numeral 1 denotes the optical axis of an object lens (not shown) provided in the left of FIG. 1; 2, a silver halide film provided at a desired focal plane of the object lens; 3, a main mirror (half mirror) which is half transparent and provided on the optical axis 1; 4, a first mirror provided so as to be tilted on the optical axis 1 of the object lens; 5, an image forming plane of paraxial rays, which is conjugate with the desired focal plane where the film 2 is provided, with respect to the first mirror 4; 6, a second mirror provided for focus state detection; 7, an infrared ray insulating filter for insulating infrared rays; 8, an iris diaphragm having two aperture openings 8-1 and 8-2 as shown in FIG. 2; 9, a secondary lens system having two lenses 9-1 and 9-2 provided in correspondence with the two aperture openings 8-1 and 8-2 of the iris diaphragm 8; 10, a third mirror provided for focus state detection; and 11, a photoelectric conversion unit having two area sensors 11-1 and 11-2.

The first mirror 4 has curvature having the power for projecting the two aperture openings 8-1 and 8-2 of the iris diaphragm near the exit pupil of the object lens (not shown). Further, a metal film, such as an aluminum film or silver film, is deposited on the first mirror 4 so that only a necessary area reflects light, therefore, the first mirror 4 functions to mask a field of view for limiting area used for focus state detection. Similarly, metal films are deposited on the other mirrors 6 and 10 in their minimum required areas so as to reduce stray light toward the photoelectric conversion unit 11. It is also effective to paint a light absorbent paint in areas which do not function as reflecting surfaces of the mirrors 4, 6 and 10, or to place shading members near the non-reflecting surface areas of the mirrors 4, 6 and 10.

Figure 2:
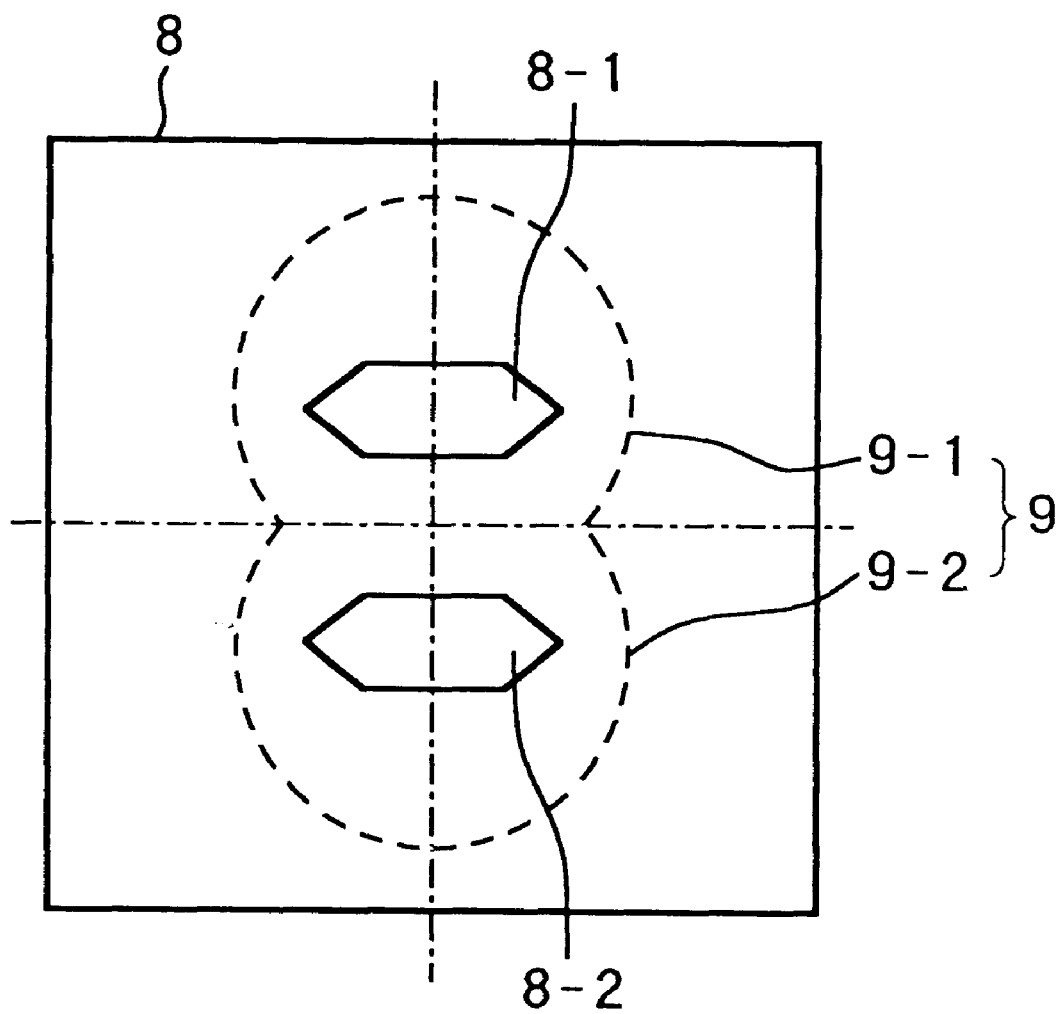
FIG. 2 is a view of an iris diaphragm according to the first embodiment of the present invention.

FIG. 2 is a plan view of the iris diaphragm 8, and it has the two aperture openings 8-1 and 8-2 arranged so that the long sides of the aperture openings 8-1 and 8-2 are set side by side (in the vertical direction in FIG. 2). The portion enclosed by a broken line shows the positions the lenses 9-1 and 9-2 of the secondary lens system 9 provided behind the iris diaphragm 8 in correspondence with the aperture openings 8-1 and 8-2 of the iris diaphragm 8.

Figure 3:
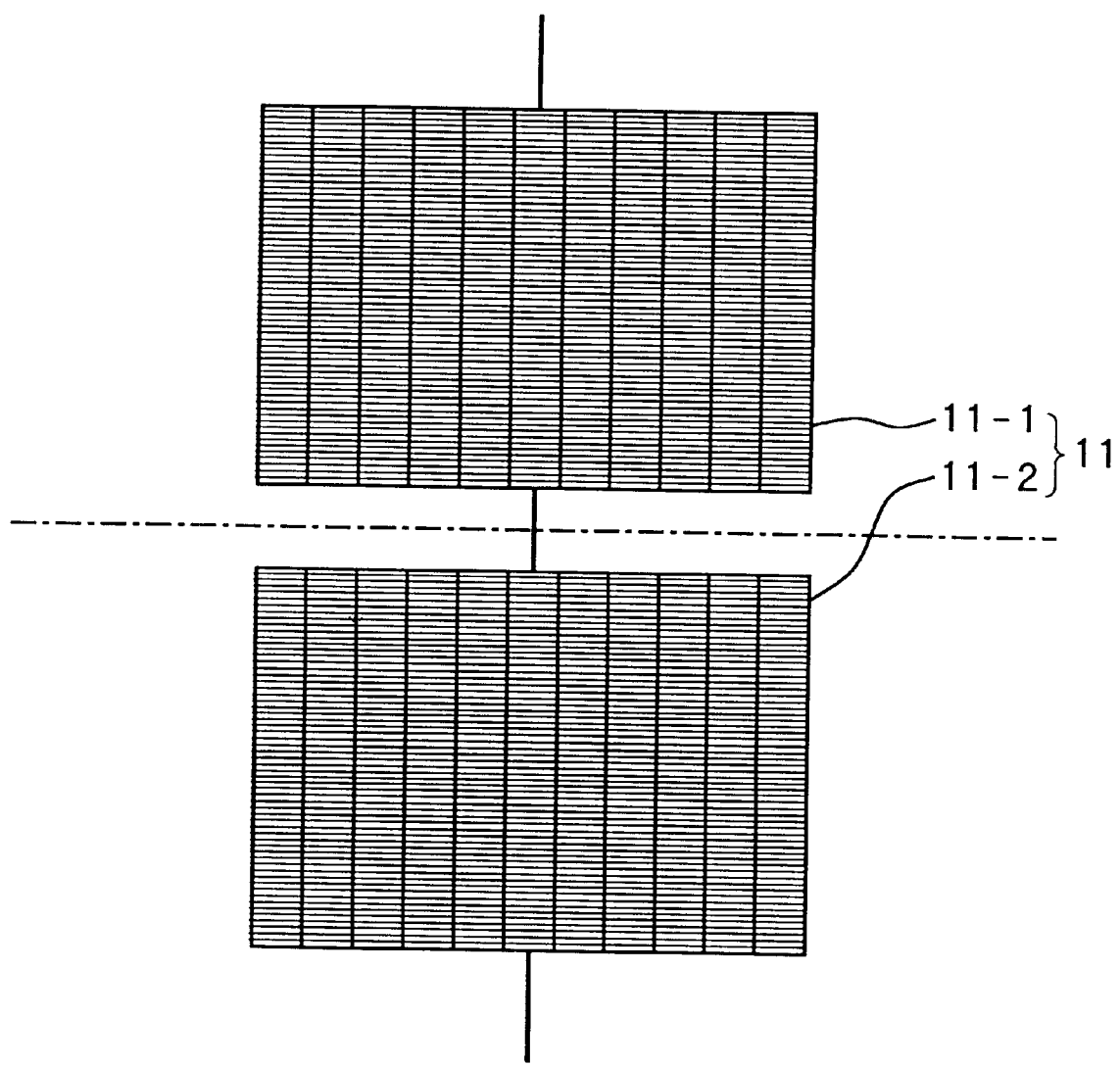
FIG. 3 is a view briefly showing a photoelectric conversion unit according to the first embodiment of the present invention.

FIG. 3 is a plan view briefly showing the photoelectric conversion unit 11, and each of the two area sensors 11-1 and 11-2, shown in FIG. 1, includes a plurality of pixels arranged in two dimensions as shown in FIG. 3, and is set at a position where an image is formed on the photoelectric conversion unit 11.

In the above configuration, flux of light 12-1 and 12-2, shown in FIG. 1, from the object lens (not shown), one of image sensing lenses, passes through the main mirror 3, is reflected by the first mirror 4 in the direction substantially parallel to the tilted main mirror 3. Thereafter, the traveling direction of the flux of light is changed again by the second mirror 6, the flux of light passes through the infrared ray insulating filter 7 and the two aperture openings 8-1 and 8-2 of the iris diaphragm 8, then is converged by the lenses 9-1 and 9-2 of the secondary lens system 9, finally, incidents on the area sensors 11-1 and 11-2 of the photoelectric conversion unit 11 via the third mirror 10. The flux of light 12-1 and 12-2 in FIG. 1 shows the one which forms an image in the central portion of the film 2. Other flux of light which incidents on different positions of the film 2 also travels the similar path to that of the flux of light 12-1 and 12-2, and reaches the photoelectric conversion unit 11. As a result, two distributions of quantity of light corresponding to an image portion formed in a predetermined two-dimensional area of the film 2 are obtained by the area sensors 11-1 and 11-2 of the photoelectric conversion unit 11.

In the first embodiment, the first mirror 4 has a curvature of a part of a curved surface obtained by revolving a quadratic curve around an axis, especially, a surface of an ellipsoid of revolution is preferred. In FIG. 1, a surface shape of the first mirror 4 has a curvature of a part of an ellipsoid of revolution obtained by revolving an ellipse 21 whose vertex is a point 20 around an axis 22 of the ellipse 21. The primary focal point of the first mirror 4 is set near a point 23 on the axis 22, and the secondary focal point is set near a point (not shown) on an optical axis 24 extended to the left side. Further, the primary focal point is conjugate with the center of the iris diaphragm 8 with respect to the second mirror 6.

At the secondary focal point, an exit pupil of the object lens is provided. Therefore, an optical image at the exit pupil of the object lens focuses on the primary focal point if not for the second mirror 6. Thus, with the second mirror 6, the optical image at the exit pupil of the object lens focuses on the center of the iris diaphragm 8 which is at the position conjugate with the primary focal point.

As described above, the first mirror 4 functions as an ideal field lens which focuses the optical image at the exit pupil of the object lens on the center of the iris diaphragm. Note, as seen from FIG. 1, the area of the first mirror 4 corresponds to a portion of the surface of the ellipsoid of revolution which does not include the rotation axis and the vertex. A particular shape of an ellipsoid used in the first embodiment is given by the following equation (1) with respect to the rotation axis.

$$x = \frac{h^2/r}{1 + \sqrt{1 - (1+k)(h/r)^2}} \quad (1)$$

Equation (1) shows a quadratic curve. When k is 0, a sphere is obtained when the curve expressed by the equation (1) is rotated; when k is $-1$, a parabolic is obtained; and when k is greater than $-1$, an ellipsoid of revolution is obtained. Further, $h^2 = y^2 + z^2$, where x, y and z respectively denote three dimensional axes, and r shows the curvature at the point 20 on the rotation axis 22. When a camera and an object lens (image sensing lens) are considered, preferred ranges of r and k are:

$-20 \leq r \leq 20$ $-1 < k \leq -0.2$

Figure 32:
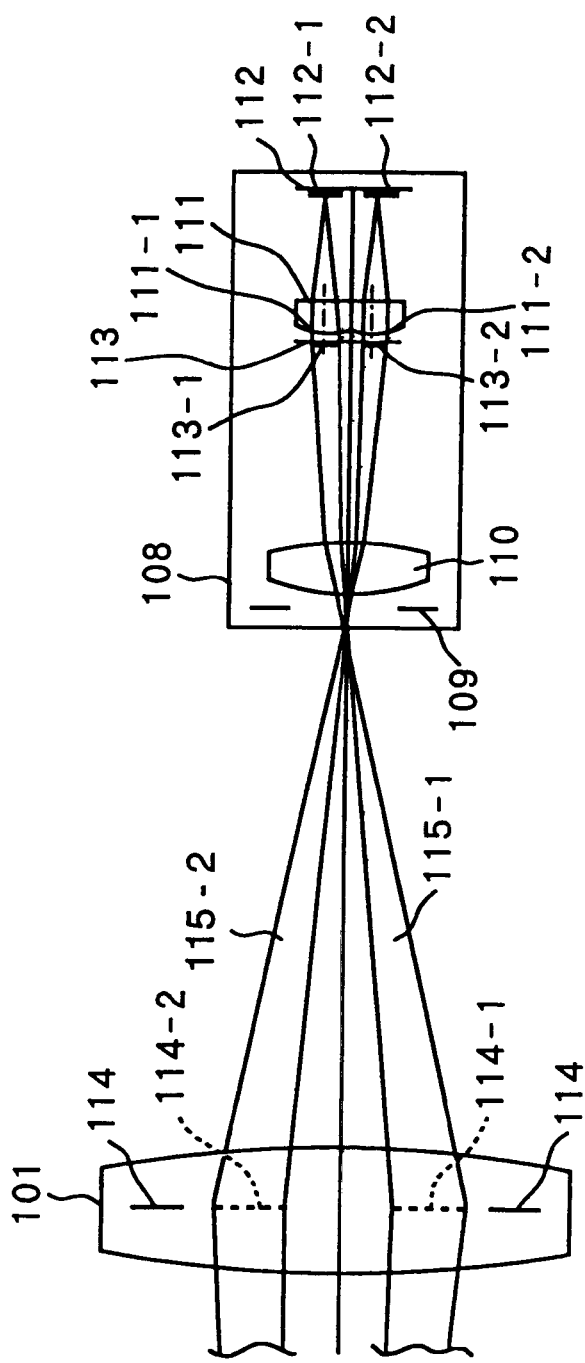
FIG. 32 is a view for explaining the conventional focus state detection unit.
Figure 33:
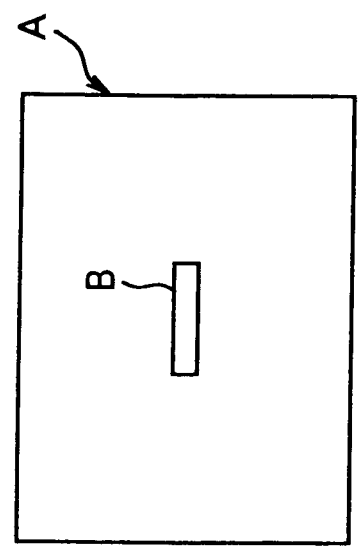
FIG. 33 is a view showing an area used for conventional focus state detection.

Furthermore, in the first embodiment, by forming the surface of the secondary lens system 9 in the side of the infrared ray insulating filter 7 in a concave shape, incoming light toward the secondary lens system 9 is not forced to refract, thereby a good uniform image forming ability is secured over a two dimensional broad area of the photoelectric conversion unit 11. By calculating a shifted amount between the distributions of quantity of light obtained by the area sensors 11-1 and 11-2 in the direction that the area sensors 11-1 and 11-2 shown in FIG. 3 are arranged, namely in the vertical direction, for each divided area pairs (will be explained later in detail) of the area sensors 11-1 and 11-2, on the basis of the principle explained with reference to FIG. 32, focus state can be detected in two-dimensional area. Note, the first mirror 4 is put out of the light path of an image when sensing the image, as well as the main mirror 3.

Next, the photoelectric conversion unit 11 will be explained in detail.

Figure 4:
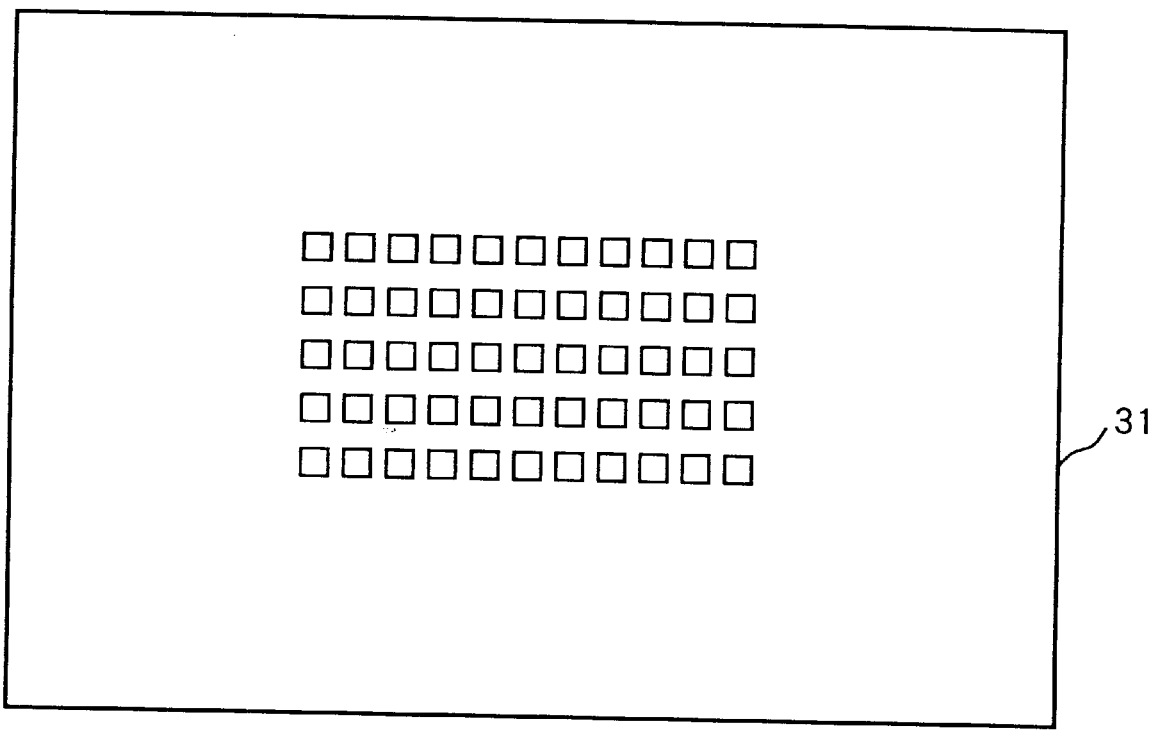
FIG. 4 is an explanatory view showing a distribution of detection centers according to the first embodiment of the present invention.
Figure 31:
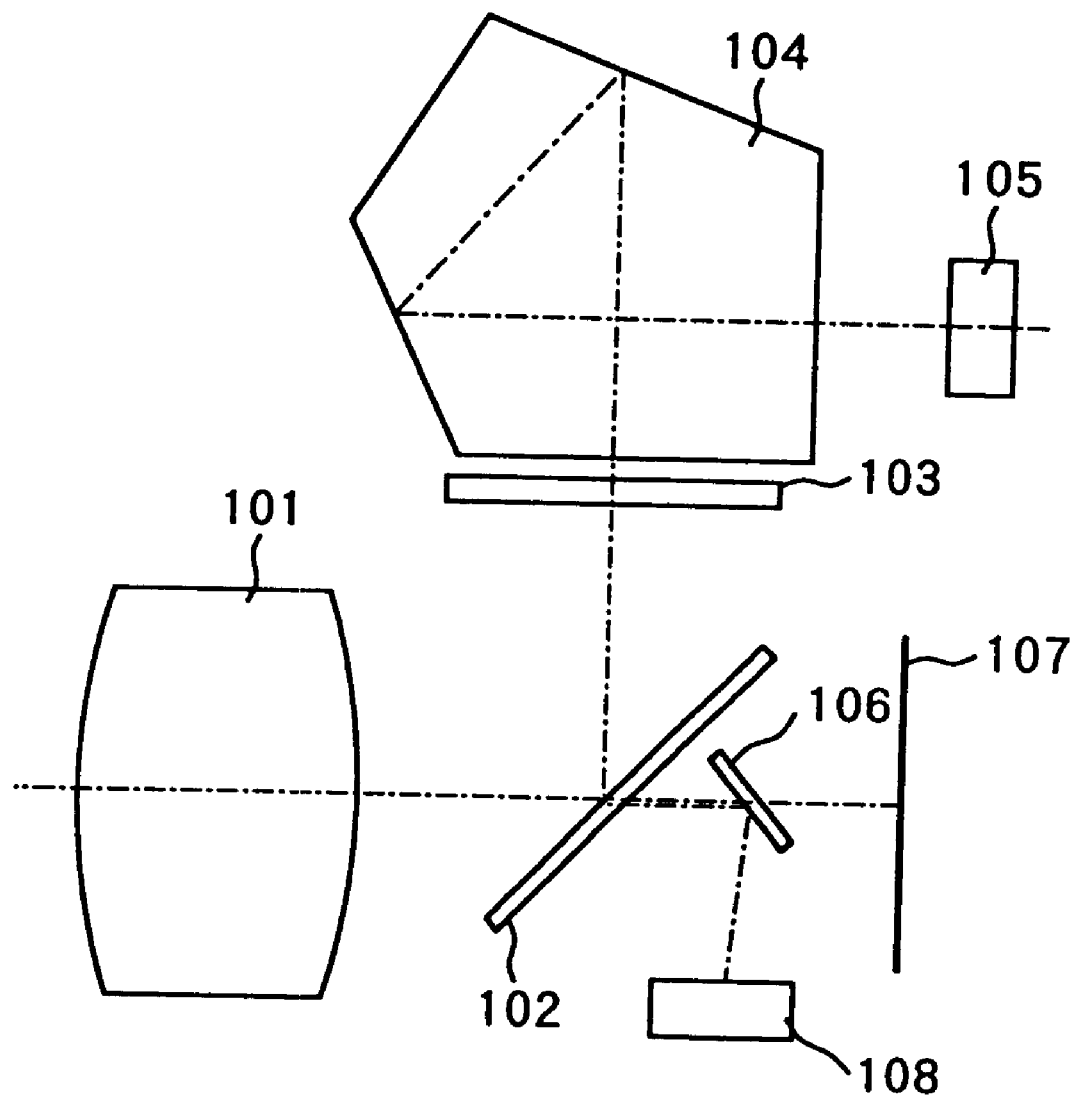
FIG. 31 is a view illustrating a brief optical configuration of a camera including a conventional focus detection unit.

FIG. 4 is an explanatory view showing a distribution of detection centers seen from a finder via the eyepiece 105 of a camera shown in FIG. 31. Referring to FIG. 4, in order to independently perform focus state detection for respective 55 detection centers (each small box indicates a detection center of each divided area) of 5 rows and 11 columns reserved in the central area of a sensed image area 31 according to the first embodiment, each of the two area sensors 11-1 and 11-2 of the photoelectric conversion unit 11 is divided into 55 areas so that the divided areas corresponds to the respective detection centers. Note, each pair of corresponding divided areas of the area sensors 11-1 and 11-2 are called "divided area pair", hereinafter.

Figure 5:
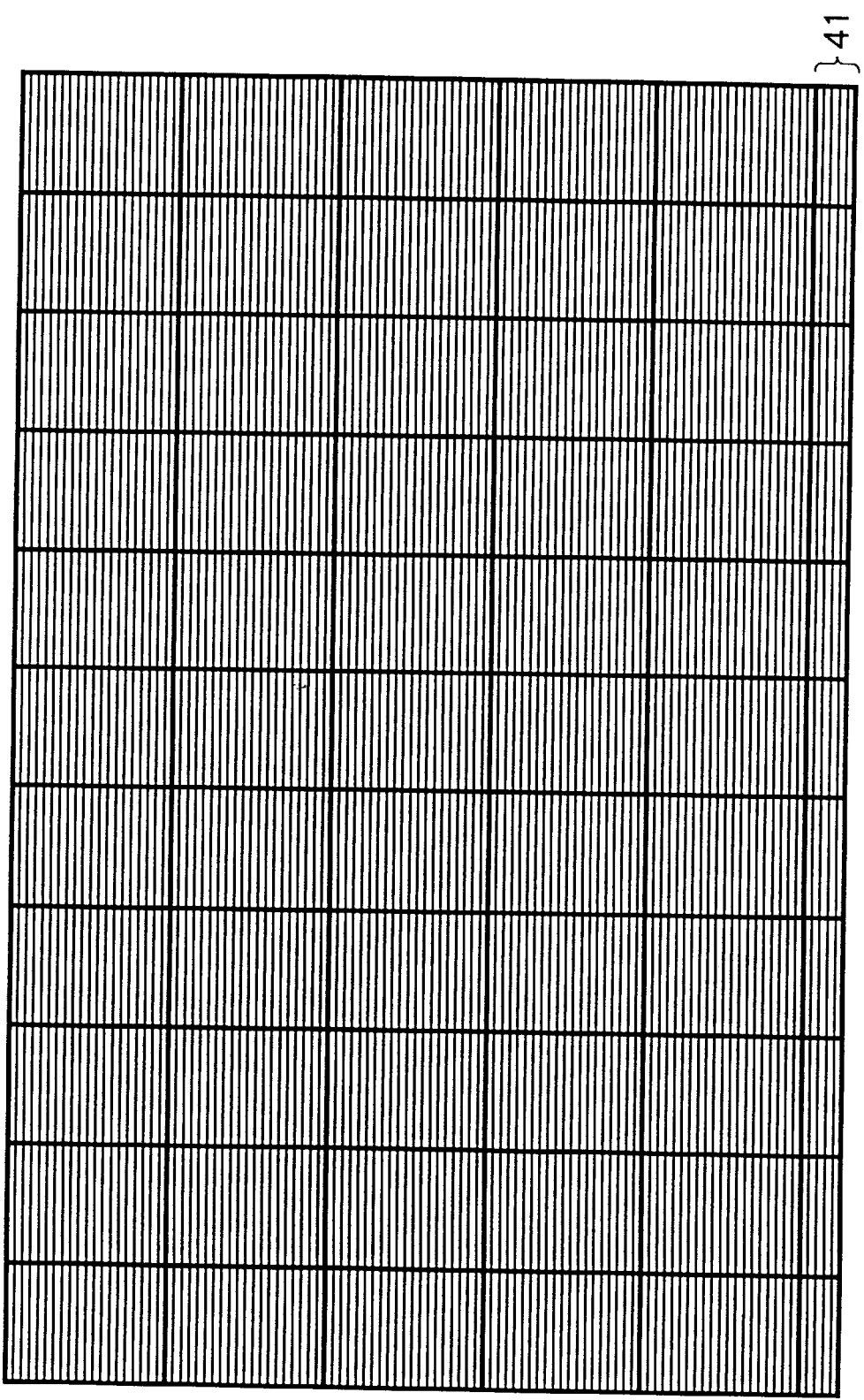
FIG. 5 is a view showing an area sensor divided in correspondence with the detection centers shown in FIG. 4 according to the first embodiment of the present invention.

FIG. 5 is an explanatory view showing that each of the area sensors 11-1 and 11-2, shown in FIG. 3, is divided into 55 areas. In FIG. 5, reference numeral 41 denotes dark pixels, corresponding to the dark pixel 120 shown in FIG. 34, for obtaining reference voltages used for obtaining difference between the maximum voltages in each divided area pair of the area sensors 11-1 and 11-2 and the corresponding reference voltage. The area sensors are used in the first embodiment, and, since charging is controlled by each divided area pair, one dark pixel is set for each divided area pair. In FIG. 5, the same number of dark pixels as that of the divided area pairs (i.e., 55) are collectively set outside of the detection area in one of the area sensors. As described above, in FIG. 5, a dark pixel is set for each of the 11×5 divided area pairs each of which includes 20 pixels. However, the number of pixels included in each of the 11×5 divided areas is not limited and may be more than 20. By using the area sensors as described above, it is possible to detect focus state in each divided area pair. Note, the lines dividing the area sensor into 55 areas are expressed in thick line for emphasizing how the areas are divided, however, the appearance of the actual area sensor shown in FIG. 5 is identical to that of an ordinary area sensor.

Figure 6:
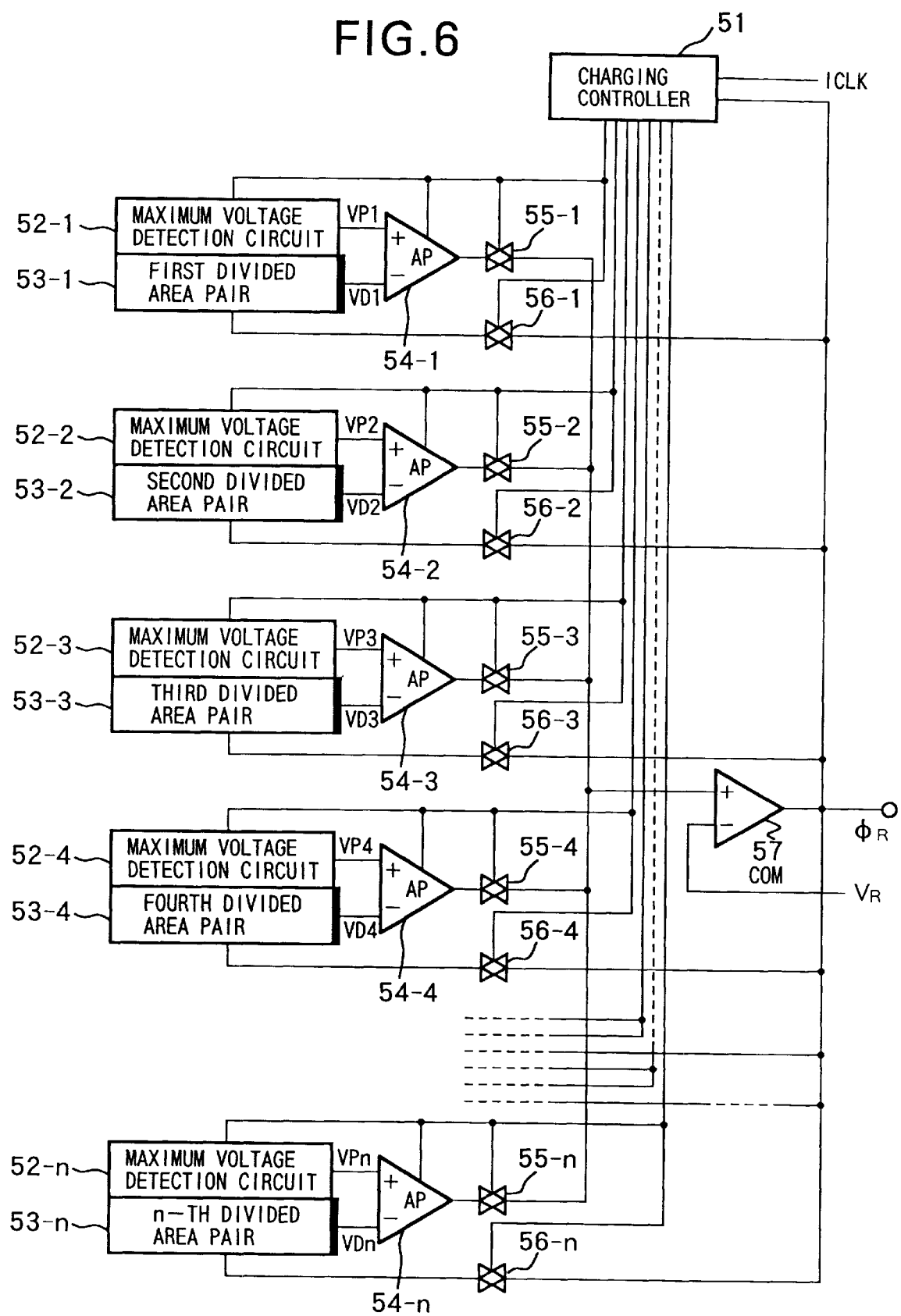
FIG. 6 is a block diagram illustrating a brief configuration of a charge control unit for the photoelectric conversion unit according to the first embodiment of the present invention.
Figure 34:
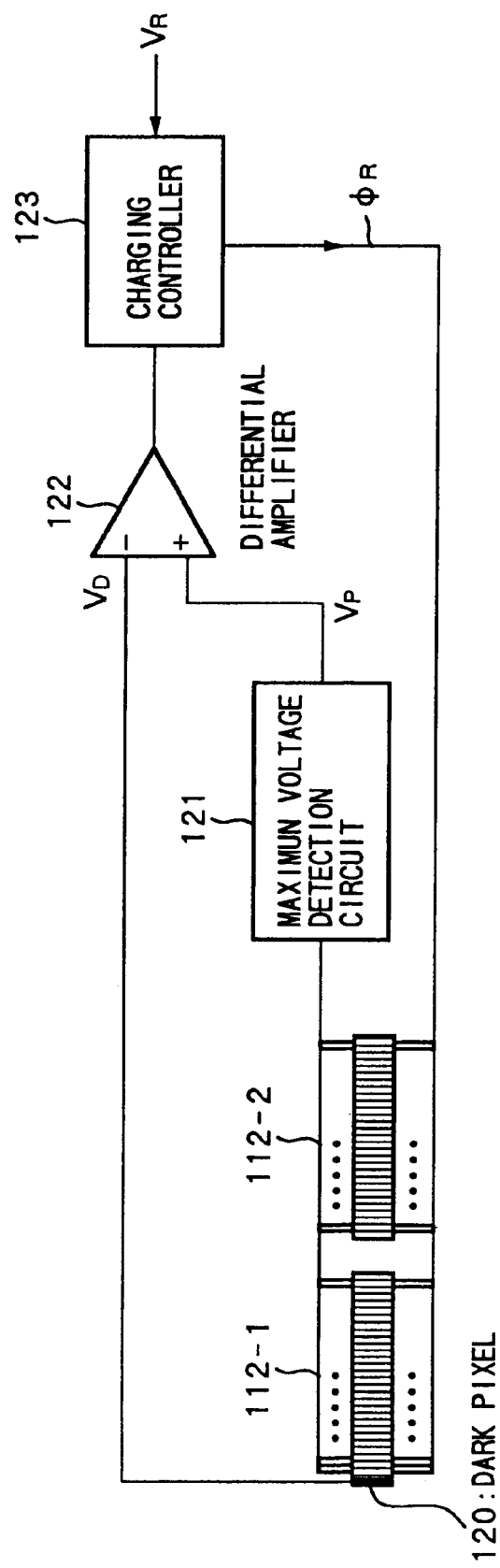
FIG. 34 is a block diagram illustrating a brief mechanism for conventional charge control.
Figure 35A:
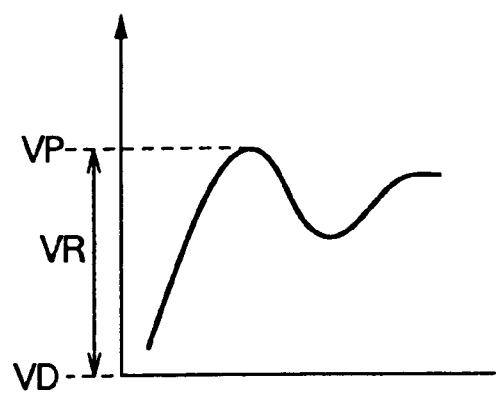
FIGS. 35A and 35B are graphs showing image signals from two line sensors.
Figure 35B:
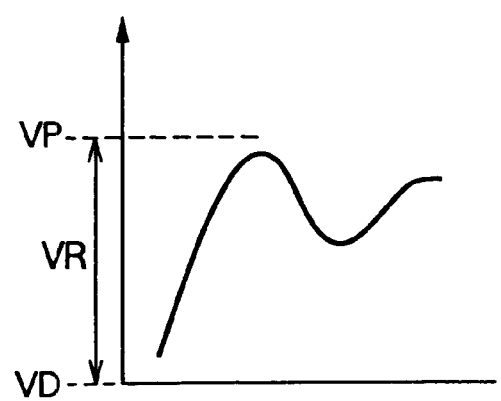
Figure 36:
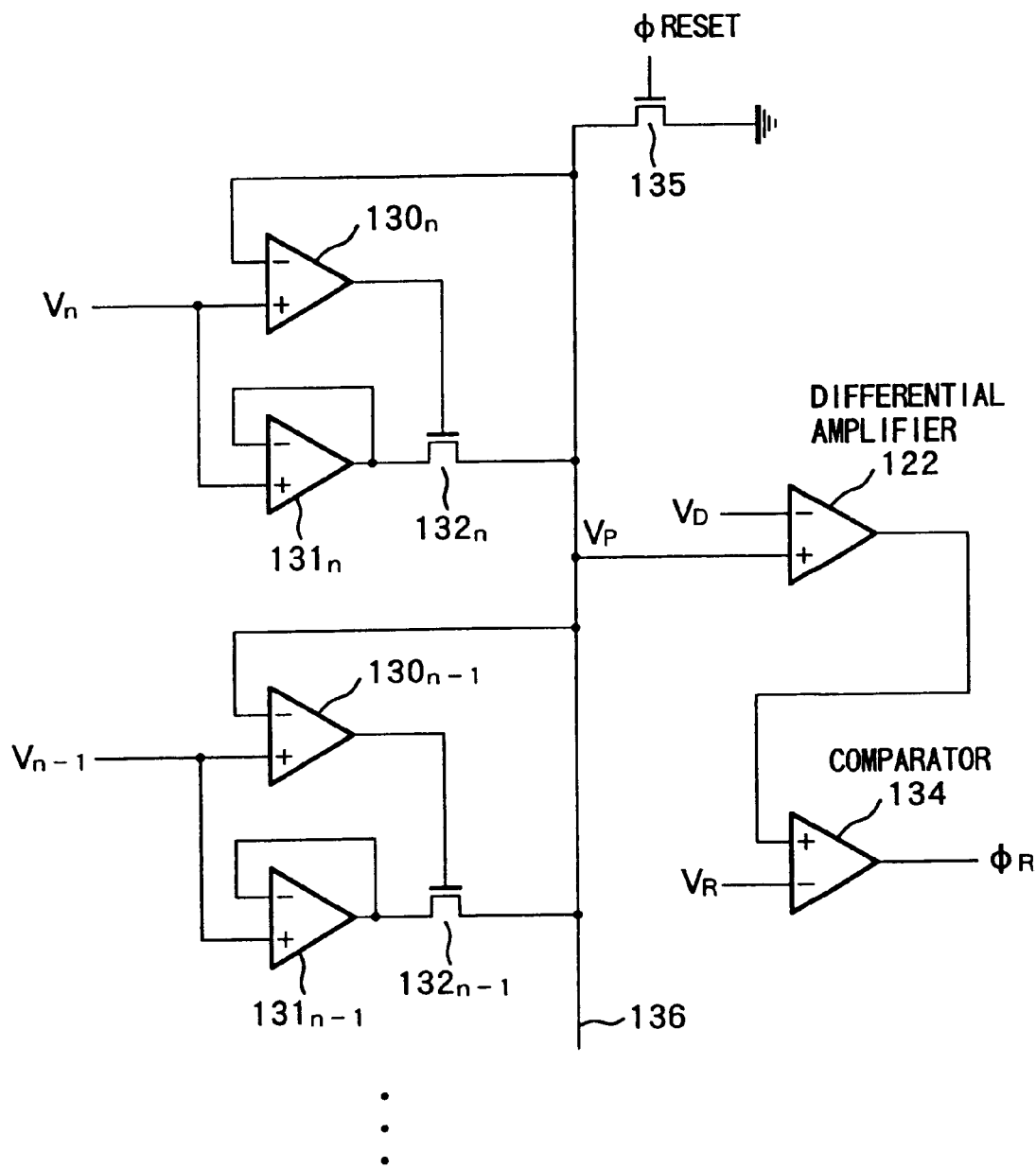
FIG. 36 is a circuit diagram showing a brief configuration of a maximum voltage detection circuit and a part of a charge controller.
Figure 37:
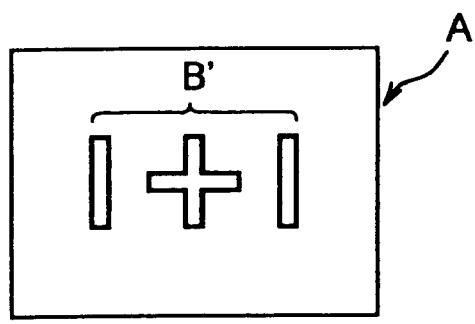
FIG. 37 is a view showing areas used for conventional focus state detection.

FIG. 6 is a block diagram illustrating a brief configuration of a charge control unit for the area sensors according to the first embodiment. For the respective first to n-th divided area pairs 53-1 to 53-n (here, n=55), shown in FIG. 5, of the area sensors 11-1 and 11-2, maximum voltage detection circuits, 52-1 to 52-n, and differential amplifiers AP 54-1 to 54-n, which operate as explained with reference to FIG. 34, are provided. An output from each of the differential amplifiers AP 54-1 to 54-n enters one terminal of a comparator COM 57 via a corresponding output switch (55-1 to 55-n), and when it reaches a common predetermined level VR, the output from the comparator inverses. The reversed output as an end-charging signal φR instructs the corresponding divided area pair (1 to n) via a corresponding switch (56-1 to 56-n) to end the charging and start reading charges. Here, in order to realize independent charging operation by each divided area pair as well as reduce the size of the unit, a charge controller 51 sequentially turns "ON" the pairs of switches, 55-1 and 56-1, 55-2 and 56-2, and so on, to 55-n and 55-n, provided for the respective divided area pairs in accordance with a clock signal ICLK.

An operation of the charge control unit shown in FIG. 6 is explained with reference to FIG. 47.

Figure 47:
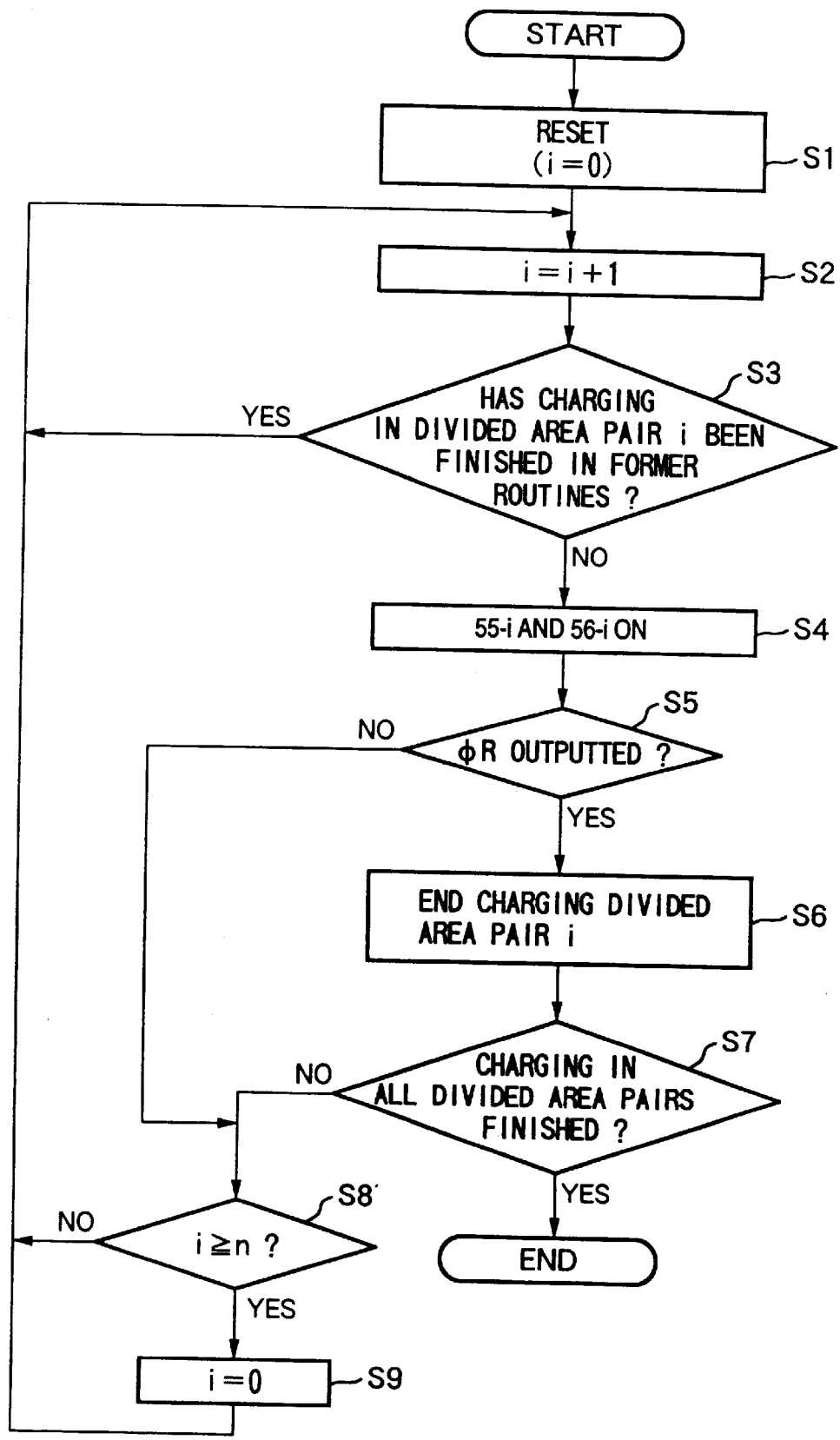
FIG. 47 is a flowchart showing an operation of the charge control unit shown in FIG. 6 according to the first embodiment of the present invention.

FIG. 47 is a flowchart showing an operation of the charge control unit. First in step S1, each element of the charge control unit is reset. At this time, the maximum voltage detection circuits 52-1 to 52-n are grounded as well as counters (not shown) for counting between 0 to n is set to 0 (count value (i)=0). Next in step S2, the count value (i) is increased by 1, and the process proceeds to step S3. In step S3, whether or not charging a divided area pair corresponding to the count value (i) has been finished in the former routines is determined. If it is, then the process returns to step S2, where the count value (i) is increased by 1, then the subsequent processes are performed. If it is determined in step S3 that the charging the divided area pair corresponding to the count value (i) has not been finished yet, the process proceeds to step S4 and switches 55-i and 56-i are turned ON. Accordingly, the output from the differential amplifier AP 54-i (i.e., the difference between the maximum value VPi at the time when the switches 55-i and 56-i are turned on and the dark voltage VDi, VPi−VDi) is inputted to the comparator COM 57, and compared with the common predetermined level VR. When VPi−VDi is equal or over VR, the end-charging signal φR is outputted from the comparator COM 57 (YES, in step S5), information indicating that charging the divided area pair i is finished is stored in step S6, then process proceeds to step S7. In step S7, whether or not charging all the divided area pairs is finished or not is checked. If it is, then the processing is completed, whereas, if it is not, the process proceeds to step S8.

Further, if NO in step S5, namely if VPi−VDi of the divided area pair i is less than VR, then the process goes to step S8.

In step S8, whether or not the count value (i) is equal or over the number of the divided area pairs is determined, and if it is not, the process returns to step S2 where the count value (i) is increased by 1 and the subsequent processes are repeated for the next divided area pair. If the count value (i) is equal or over n, then the count value (i) is reset to 0 in step S9, thereafter, the process returns to step S2 and the processes as described above are repeated.

It should be noted that sufficient quantity of light does not always incident on all the divided area pairs and VPi−VDi does not always exceeds the predetermined level VR. Accordingly, it is possible to control charging so as to terminate charging divided area pairs which are still charging after a predetermined period of time lapses. Further, when charging is terminated after the predetermined period of time, if VPI−VDi≧VR is not achieved in any divided area, an error message indicating this state may be informed to a user. Furthermore, it is also possible to control to continue charging the divided area pairs until more than a predetermined number of the divided area pairs output the maximum values satisfying VPi−VDi≧VR. The present invention is not limited to the aforesaid controls, and various changes can be made.

Further, the charge controller 51 can be configured by a hardware structure or by a software structure using a CPU.

In the first embodiment, as for charge control performed for obtaining phase differences between a pair of image signals, the control equivalent to the one explained with reference to FIG. 34 is performed for each divided area pair. Therefore, charging operation of two area sensors 11-1 and 11-2 of the photoelectric conversion unit 11 in FIG. 3 is performed in parallel by each divided area pair. Since image signals for focus state detection can be obtained by each divided area pair on the basis of the difference between the maximum value of each divided area pair and the corresponding dark voltage as described above, it is possible to realize high-precision focus state detection.

Note, the phase difference between image signals obtained by each divided area pair occurs in the direction that pixels are arranged in each divided area, namely, in the direction of columns in FIG. 5.

Second Embodiment

Figure 7:
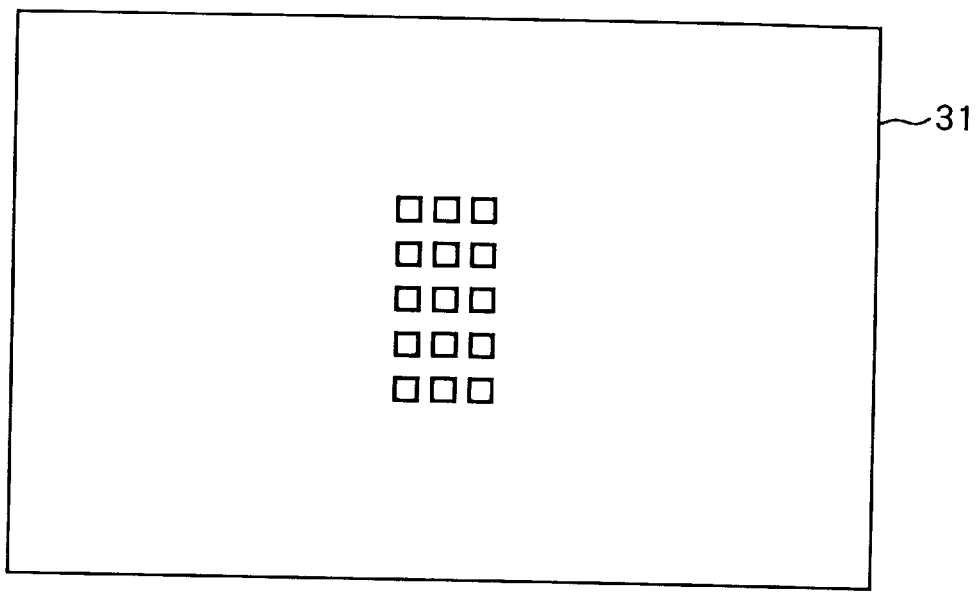
FIG. 7 is a view showing a distribution of detection centers according to a second embodiment of the present invention.

FIG. 7 is a view showing an arrangement of detection centers when central three columns out of the 11×5 divided areas, shown in FIG. 5, are used for focus state detection. In order to limit the divided area pairs to be used for focus state detection, control signals to turn on the analog switches 55-i and 56-i corresponding to the desired divided area pairs are sequentially outputted from the charge controller 51. In a case of FIG. 7, circuits corresponding to the fifteen divided area pairs are selected to operate. For example, in a case where the detection centers shown in FIG. 4 are numbered sequentially from the upper-right corner (top-down and to the left), the switches 55-21, 56-21 to 55-35 to 56-35 corresponding to the twenty-first to twenty-fifth detection centers as shown in FIG. 7 are sequentially turned ON.

The purpose of limiting the number of the divided area pairs to be used for focus state detection is to avoid inappropriate charged state when sensing a high-luminous object, i.e., saturated state. More specifically, since the charge control in the first embodiment is performed sequentially by each divided area pair, determination on timing for terminating charging a given divided area pair is performed at certain interval. If a period of time for obtaining proper image signals by charging the given divided area pair is short, only the saturated image signals may be obtained when timing for terminating charging all the divided area pairs are sequentially determined as described above with reference to FIG. 47. In such case, it is impossible to detect focus state. Thus, by reducing the number of the divided area pairs to be charge controlled, the interval at which the determination on charged state of each divided area pair is shortened, thereby proper charging may be performed.

Note, it is possible to control in such manner that, after charge control in all the divided area pairs, saturated area pairs are selected and controlled to charge again in the aforesaid manner. Even though the charging operation is repeated on the saturated divided area pairs, since required time for charging those divided area pairs on which light from a high-luminous object incidents is short, charging those divided area pairs may be finished while performing calculation for focus state detection for the other divided area pairs. Therefore, an effect of repeating charging on throughput is small.

In the second embodiment, the limitation on the number of divided area pairs is set by unit of column (five divided area pairs in the vertical direction) in the sensed image area 31. This is to restrain the size of the charge controller 51 while providing it with necessary function for controlling each divided area pair. Even without providing an ability for limiting arbitrary divided area pairs to the charge controller 51, with control for prohibiting divided area pairs to output signals, which is explained in the following embodiments, selection of arbitrary divided area pairs to be used for focus state detection can be realized.

Third Embodiment

Figure 8:
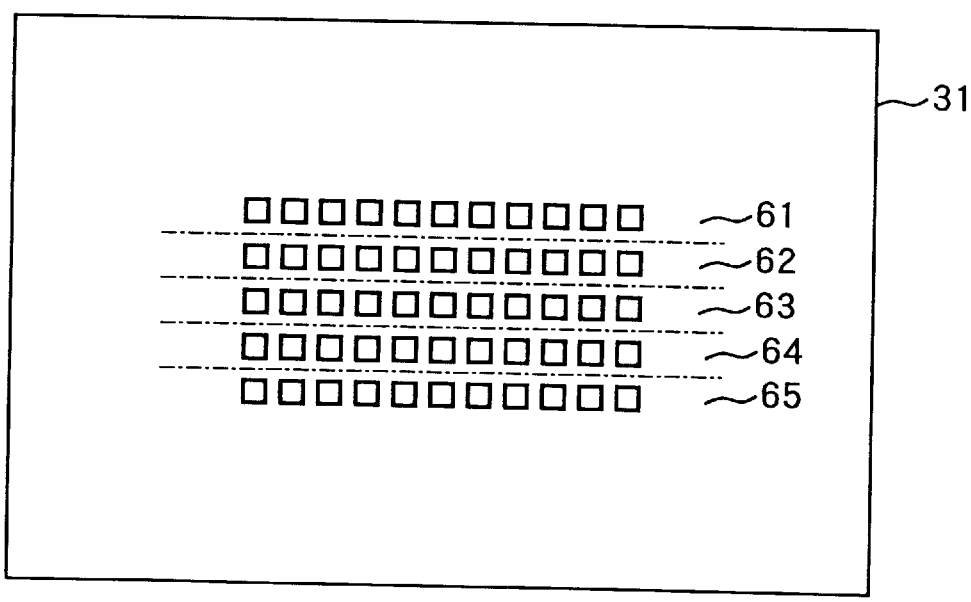
FIG. 8 is a view showing a distribution of detection centers according to a third embodiment of the present invention.

FIG. 8 is a view showing five horizontal units 61 to 65 of detection centers by which transference of charges are restricted in the sensed image area 31. A signal to control to end charging is outputted to all the divided area pairs which belongs to a horizontal unit simultaneously. Combination of this output restriction by line and the limitation on the number of divided area pairs to be used for focus state detection by column, as described in the second embodiment, enables to easily set arbitrary divided area pairs to be used for focus state detection.

Figure 9:
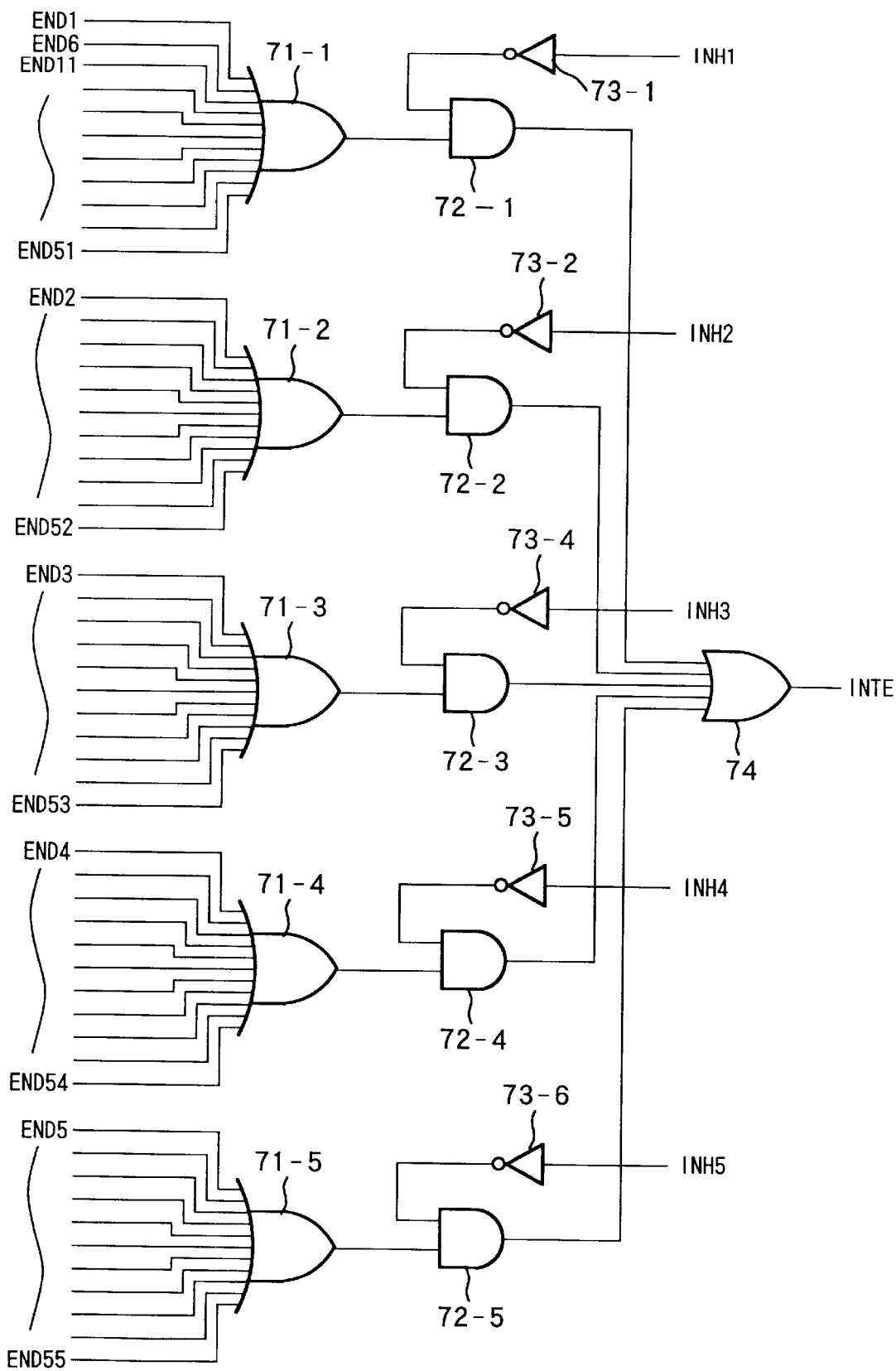
FIG. 9 is a circuit diagram for explaining output restriction function according to the third embodiment of the present invention.

FIG. 9 is a circuit diagram for explaining output restriction function according to the third embodiment. In the third embodiment, an output terminal INTE for outputting the end-charging signal φR is connected to a microcomputer which controls the overall operation of the camera so that the microcomputer can detect the completion of charging operation. The INTE terminal is provided in order to notify the microcomputer of completion of charging any of divided area pair in a horizontal unit. Charge output is allowed or prohibited by each of five horizontal units 61 to 65 shown in FIG. 8.

Refer to FIG. 9, end-charging signals END1 to END55 (corresponding to φR signal for each divided area pair. The numbers indicate the respective divided area pairs when the detection centers, shown in FIG. 8, are numbered sequentially from the upper-right corner (top-down and to the left) are inputted to OR gates 71-1 to 71-5 corresponding to the horizontal units 61 to 65, respectively, by horizontal unit, then outputs from the OR gates 71-1 to 71-5 enter respective AND gates 72-1 to 72-5. Control signals INH1 to INH5 are also inputted to the AND gates 72-1 to 72-5 via inverters 73-1 to 73-5. Outputs from the AND gates 72-1 to 72-5 are inputted to an OR gate 74, and the output from the OR gate 74 is outputted to the INTE terminal. In FIG. 9, as described above, the control signals INH1 to INH5 are used for controlling the respective horizontal units 61 to 65. When any of the control signals INH1 to INH5 is set to 1, then the end-charging signals ENDi (i=1 to 55) of the divided area pairs belonging to the horizontal unit corresponding to the control signal set to 1 do not appear at the output terminal INTE. When practical control of a camera is considered, the detection of completion of charging only the divided area pairs to be actually used for focus state detection is needed, excess individual control of divided area pairs is not necessary.

For example, assume an image of an object on which a user wants to focus is formed in the upper portion of the 55 detection centers shown in FIG. 8. In this case, the control signals INH1 and INH2 are set to "0" so as to select the upper two horizontal lines, and the remaining control signals INH3 to INH5 are set to "1". Accordingly, charge output from the divided area pairs belonging to the horizontal units 61 and 62 is allowed. Accordingly, when maximum voltages with respect to corresponding dark voltages in divided area pairs which do not belong to the selected two horizontal units exceed the predetermined level VR, charging operation is continued and charges are not outputted from those divided area pairs.

By controlling output of the end-charging signals by horizontal unit as described above, it is possible to perform focus state detection on desired divided area pairs by using image signals of proper level outputted only from the desired divided area pairs without performing excess control over the divided area pairs which are not used for focus state detection.

Fourth Embodiment

Figure 10:
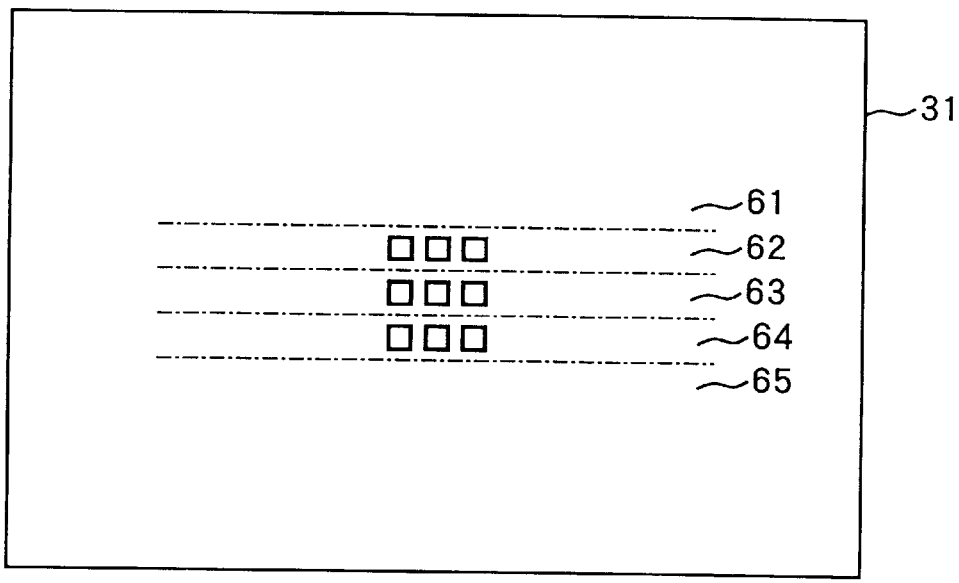
FIG. 10 is a view showing a distribution of detection centers according to a fourth embodiment of the present invention.

FIG. 10 shows an example for controlling the divided area pairs by combining the limitation on the number of divided area pairs to be used for focus state detection by column as described in the second embodiment with reference to FIG. 7 and the output restriction explained with reference to FIGS. 8 and 9 when the control signals INH1 and INH5 are set to "1", so that image signals are outputted only from the divided area pairs corresponding to the nine central detection centers. By controlling in this manner, the same effect as operating only the central nine divided area pairs can be achieved.

Fifth Embodiment

Figure 11:
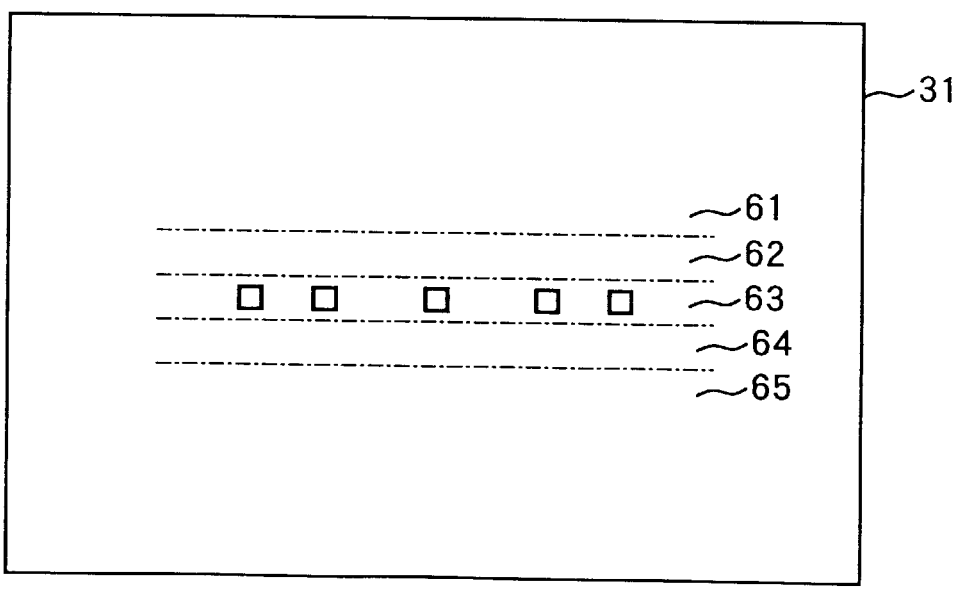
FIG. 11 is a view showing a distribution of detection centers according to a fifth embodiment of the present invention.

FIG. 11 is a view showing a distribution of detection centers according to a fifth embodiment of the present invention. Referring to FIG. 11, limitation on divided area pairs to be used for focus state detection is applied to discrete columns, and output restriction is applied to four horizontal lines (in this case, INH3 in FIG. 9 is "0" and other control signals are "1"). With the above control, the divided area pairs corresponding to five detection centers discretely arranged in the central horizontal line, as shown in FIG. 11, in the sensed image area 31 are used for focus state detection.

Figure 12:
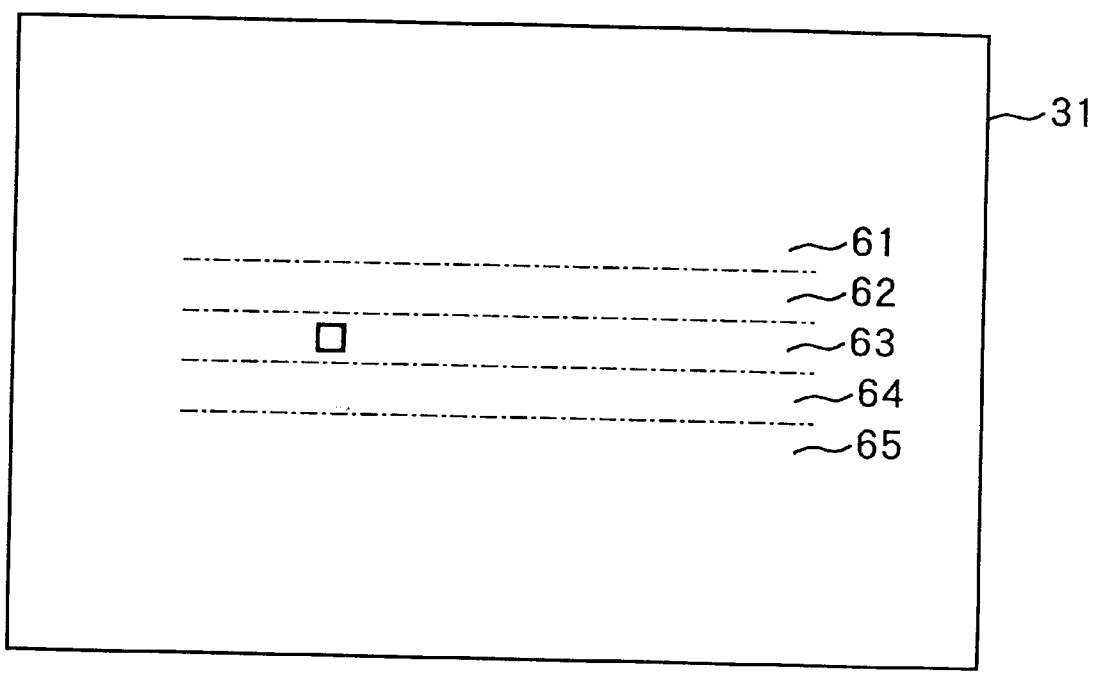
FIG. 12 is a view showing a distribution of detection centers according to the fifth embodiment of the present invention.

Further, FIG. 12 is a view showing a distribution of detection centers according to the fifth embodiment of the present invention. Referring to FIG. 12, only one column is selected and the output restriction is performed except one horizontal line. In this case, a control for virtually operating only one divided area pair is realized. More specifically, when completion of charging this divided area pair is detected, charged signals stored only in this divided area pair are outputted.

Sixth Embodiment

Figure 13:
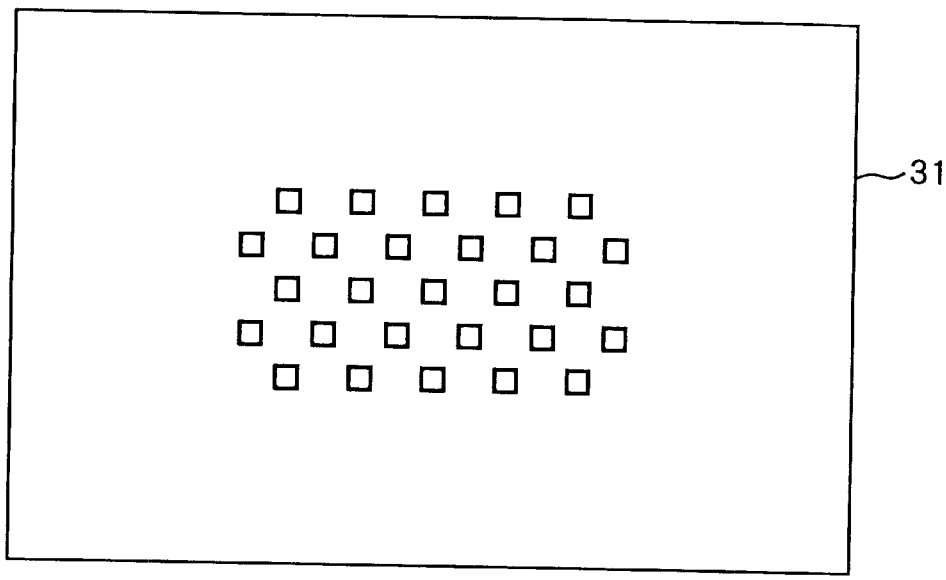
FIG. 13 is a view showing a distribution of detection centers according to a sixth embodiment of the present invention.

FIG. 13 shows a distribution of detection centers seen from a finder of a camera according to a sixth embodiment of the present invention. As shown in FIG. 13, in the central part of the sensed image area 31, three detection centers and two detection centers are alternatively provided in columns. Each of the area sensors 11-1 and 11-2 is divided into 27 areas so as to correspond to detection centers arranged as described above in a check pattern.

By dividing each area sensor in the aforesaid manner, although the number of divided areas is less than the one shown in FIG. 4, the necessary and enough number of divided areas for performing effective focus state detection in two-dimensional area are secured.

Figure 14:
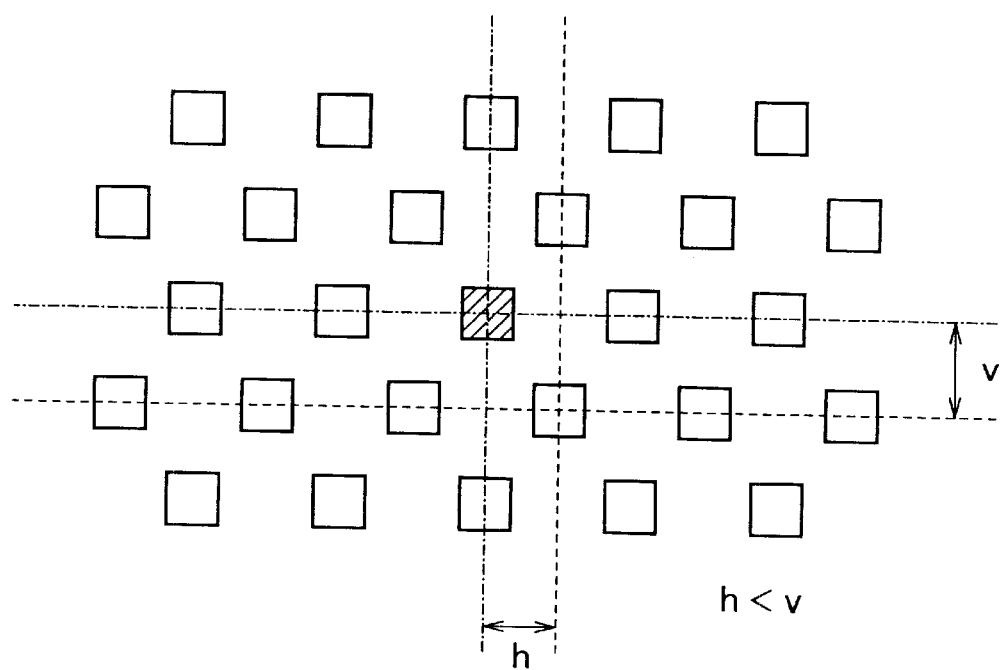
FIG. 14 is a view showing a distribution of detection centers according to the sixth embodiment of the present invention.

Further, at the center of the sensed image area 31, a detection center should be arranged, basically. Therefore, according to the sixth embodiment, the odd number (three and five) of detection centers are set in the column and row including the center of the sensed image area (shown by a square with oblique lines in FIG. 14), and detection centers are arranged symmetrically with respect to both the vertical and horizontal lines passing through the center of the sensed image area 31, as shown in FIG. 14, to give balanced-looking and increase operability.

Further, in order to set many detection centers in the direction of the long side (i.e., horizontal direction, in this case) of the sensed image area, each area sensor is divided so that density of detection centers in the horizontal direction is relatively high, whereas density of detection centers in the vertical direction is relatively low. More specifically, referring to FIG. 14, as for the intervals, h and v, between detection centers in the horizontal and vertical directions, relationship h<v is set. In this relationship, the interval between the detection centers is shorter in the direction of the long side of the sensed image area than that in the direction of the short side and the more the detection centers are arranged in the direction of the long side than those arranged in the short side. With the aforesaid arrangement, the detection centers are distributed densely in the two dimensional area.

Note, the relationship between h and v described above is h<v, and more specifically, v<2h. 2h is the horizontal interval between detection centers which are in columns including the same number of detection centers (namely, columns including three detection centers or columns including two detection centers, in this case).

When the relationship between h and v is set to either v>2h or 2v<h, intervals between detection centers are widely apart. Therefore, it is limited to h<v<2h in the sixth embodiment.

Each of the area sensors 11-1 and 11-2 of the photoelectric conversion unit 11 is divided into 27 areas corresponding to respective detection centers as described above.

Figure 15:
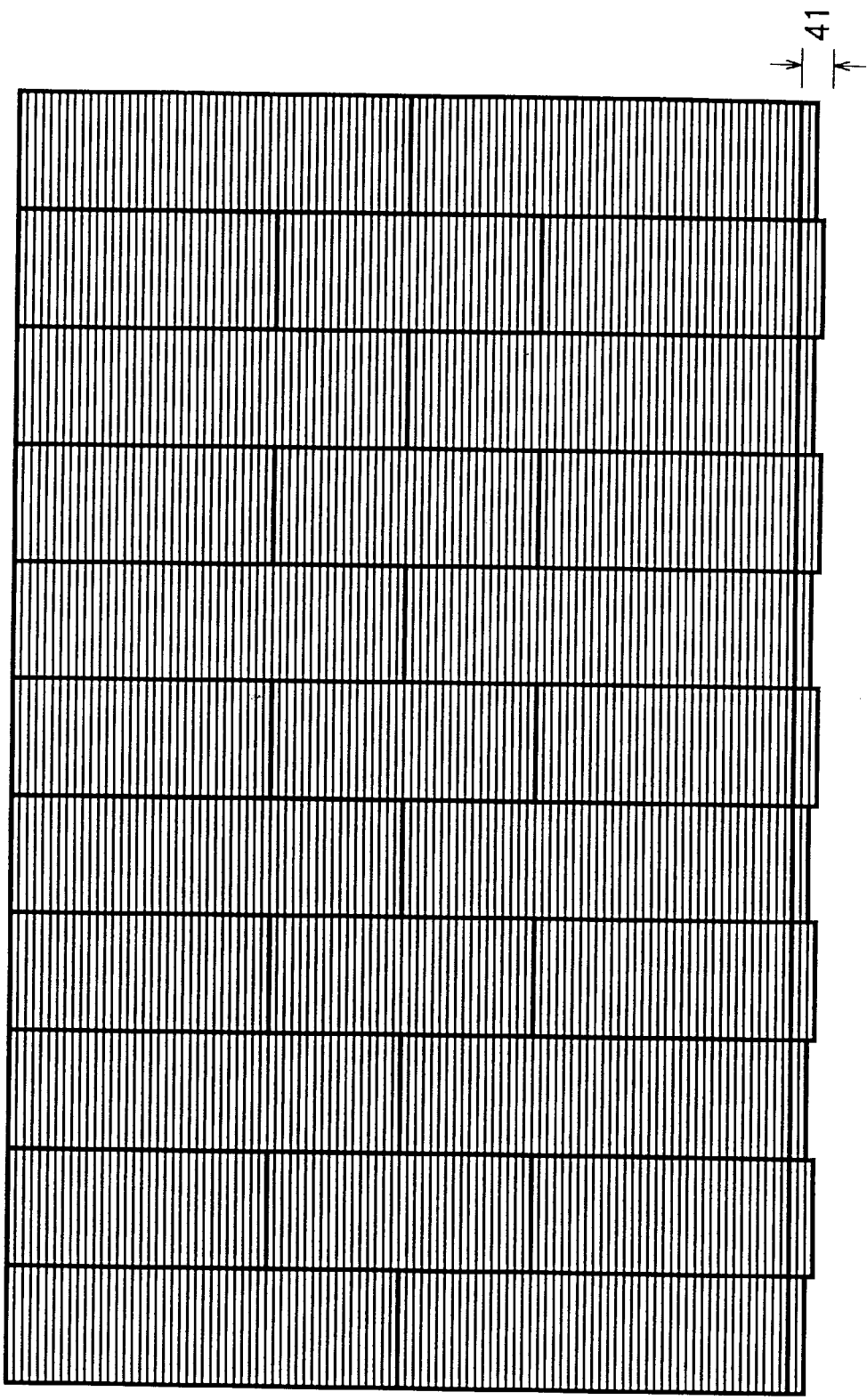
FIG. 15 is a view showing a plurality of divided areas of one of the area sensors according to the sixth embodiment of the present invention.

FIG. 15 is a view showing a plurality of divided areas of one of the area sensors according to the sixth embodiment. As seen in FIG. 15, by dividing the sensor having the limited number of pixels are divided into three or two areas in the vertical direction, it is possible to achieve good precision in focus state detection since the enough number of pixels are included in each area.

Further, to arrange the area sensors of the photoelectric conversion unit so that the long sides of the area sensors are set side by side is also very effective in order to set detection centers closely to each other.

Note, the area sensors 11-1 and 11-2 divided as shown in FIG. 15 are controlled by the similar charge control unit described with reference to FIG. 6 in the same manner as described with reference to FIG. 47 in the first embodiment.

Further, since each area sensor is divided into 27 areas, the number of n is 27 in the sixth embodiment. However, the sixth embodiment is not limited to this. For example, two more columns, one divided into three areas and the other divided into two areas, may be added to the 27 divided areas in each of the right and left sides to obtain 37 divided areas. Further, two columns, i.e., five divided areas, may be cut from each of the right and left sides of the 27 divided areas to obtain 17 divided areas. Furthermore, instead of dividing the columns into two and three areas, the columns may be divided into three and four areas.

Seventh Embodiment

In the sixth embodiment, intervals between the detection centers are intentionally made different in the vertical direction from the horizontal direction. However, a camera is sometimes used to take a photo with the shorter side at the top, in which case, the conceptions of "vertical" and "horizontal" are exchanged. In order to increase operability by removing the conceptions of vertical and horizontal, intervals between the detection centers in the vertical and horizontal directions are made equal.

Figure 16:
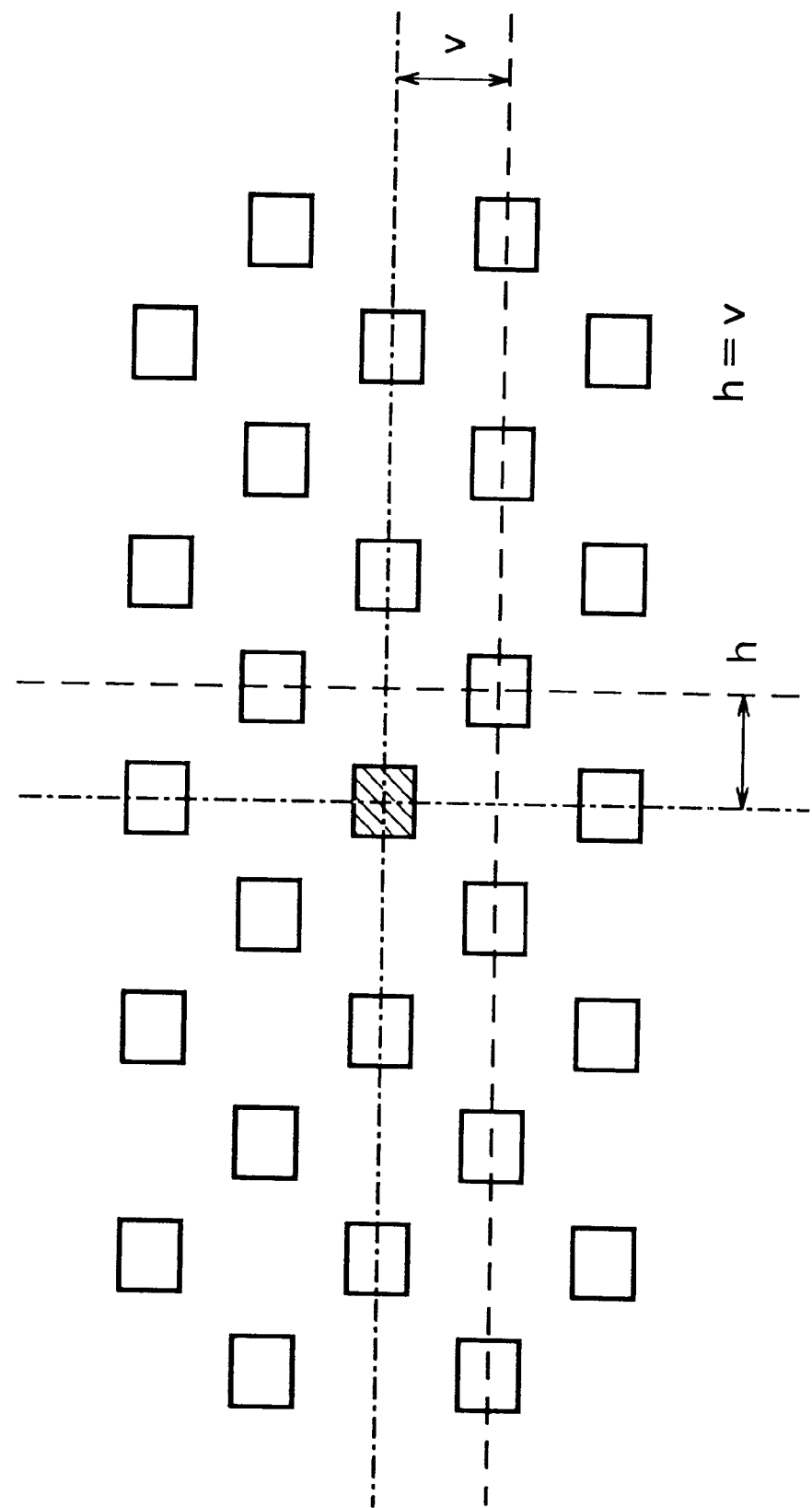
FIG. 16 is a view showing a distribution of detection centers according to a seventh embodiment of the present invention.

An arrangement of detection centers in this case is shown in FIG. 16. Here, the relationship between the horizontal and vertical intervals, h and v, is h=v.

Figure 17:
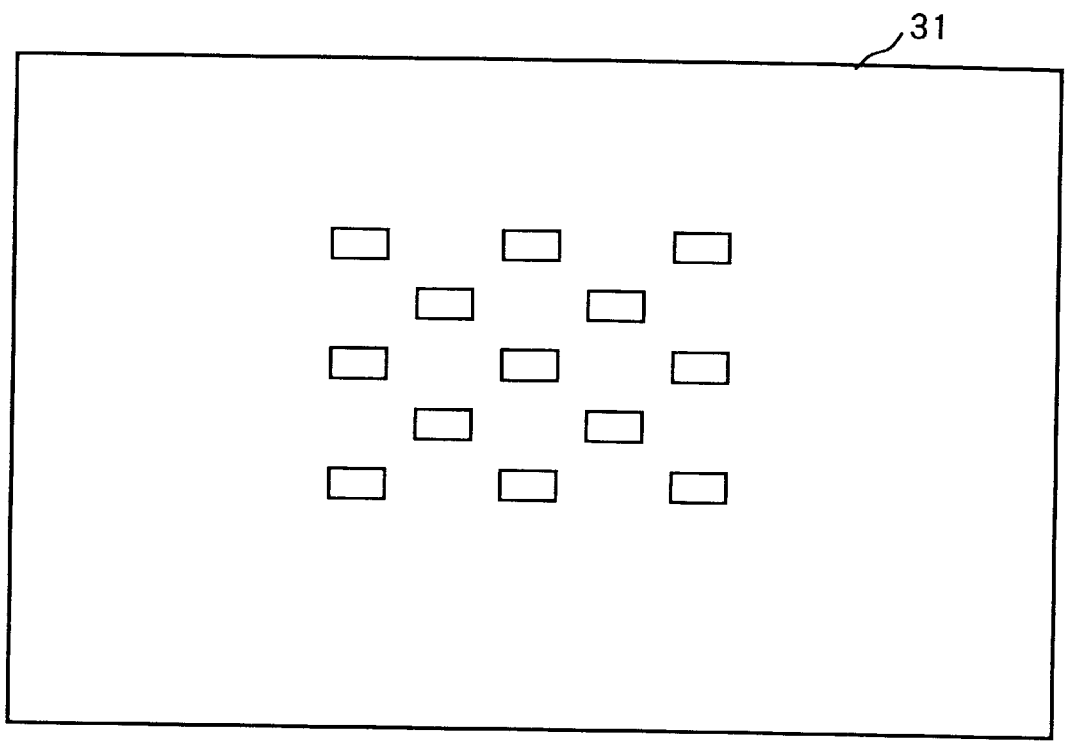
FIG. 17 is a view showing a distribution of detection centers according to the seventh embodiment of the present invention.
Figure 18:
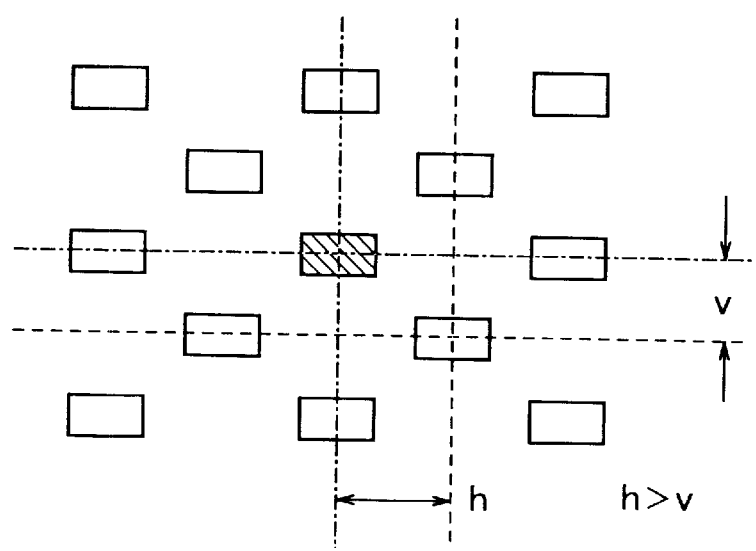
FIG. 18 is a view showing a distribution of detection centers according to the seventh embodiment of the present invention.

Depending upon the configuration of the area sensors, there would be a case where the same number of the detection centers are arranged in the horizontal and vertical directions. In this case, by arranging detection centers so that a ratio of an interval between the detection centers in the vertical direction to an interval in the horizontal direction is the same as a ratio of the short side length to the long side length of the sensed image area, a camera of good operability can be designed. FIG. 17 shows an example of the detection centers arranged as described above. As seen in FIG. 17, the detection centers are arranged so that the intervals between detection centers in the vertical and horizontal direction are set on the basis of the ratio of one side length to the other side length of the sensed image area. More specifically, as shown in FIG. 18, the relationship between h and v is the same as the relationship between the horizontal side length and the vertical side length of the sensed image area. Inversely, the sensed image area may be designed so as to optimize the relationship between h and v.

Furthermore, it is possible to arrange the detection centers so that the ratio of the number of the detection centers in the horizontal direction to the number in the vertical direction equals to the ratio of the horizontal side length to the vertical side length of the sensed image area.

Eighth Embodiment

In the aforesaid embodiments, distributions of quantity of light are obtained by the area sensors 11-1 and 11-2, which are arranged separately in the vertical direction, of the photoelectric conversion unit 11, as shown in FIG. 3, and the shift between the distributions in the vertical direction is detected. In a focus state detection apparatus having this type of configuration, it is possible to focus on an object whose luminance varies in the vertical direction, e.g., an object having horizontal stripes, however, it is not possible to focus on an object whose luminance does not vary in the vertical direction, e.g., an object having vertical stripes.

Figure 19:
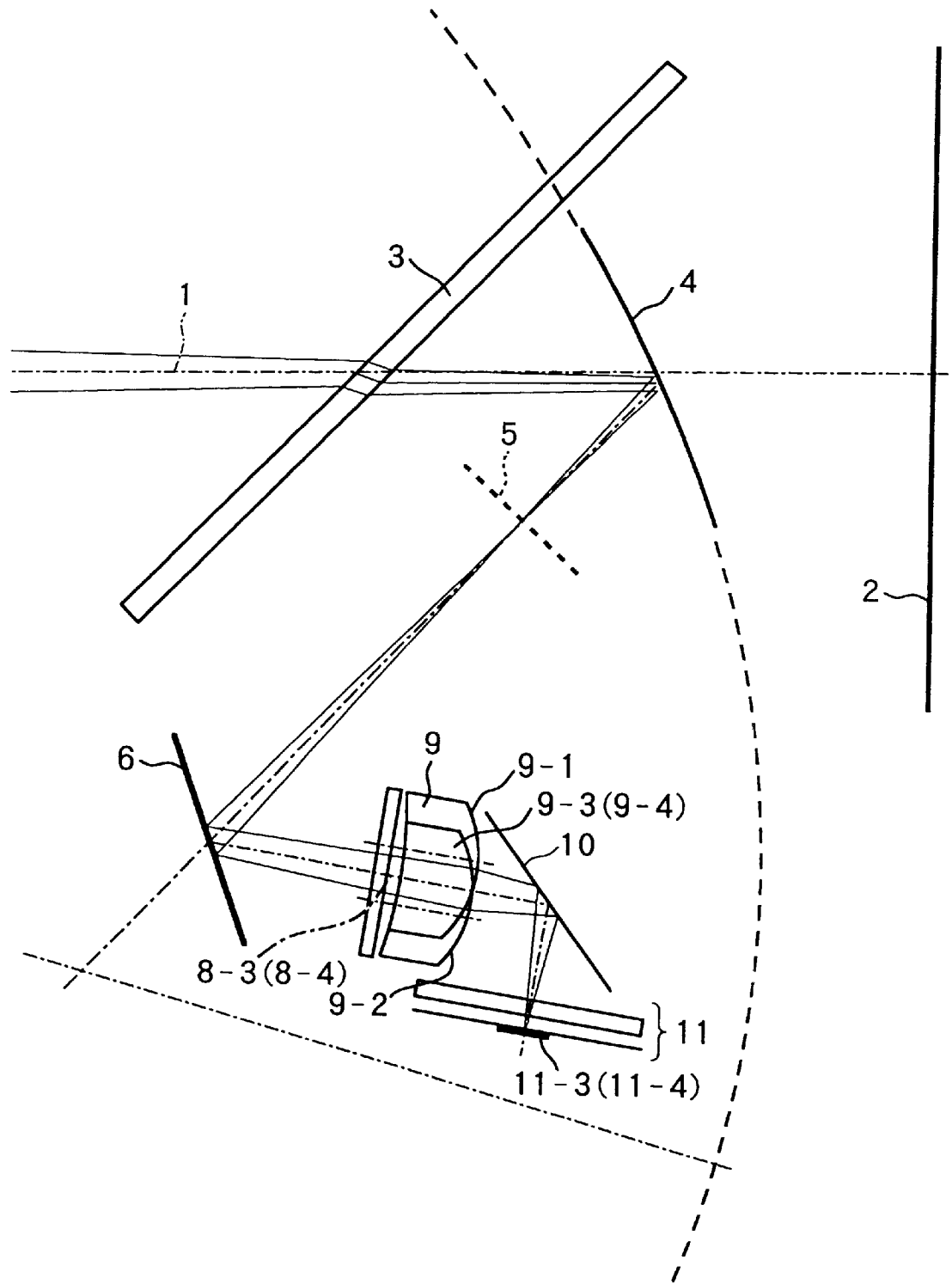
FIG. 19 is a view showing an optical path according to an eighth embodiment of the present invention.

An arrangement of optical system according to an eighth embodiment addressed to overcome the aforesaid problem is shown in FIG. 19. Difference between the configurations shown in FIG. 19 and shown in FIG. 1 is that, in FIG. 19, two more lenses 9-3 and 9-4 are added to the secondary lens system 9 in the orthogonal direction with respect to the two lenses 9-1 and 9-2, and aperture openings 8-3 and 8-4 of the iris diaphragm 8 and area sensors 11-3 and 11-4 of the photoelectric conversion unit 11 are provided so as to correspond to the lenses 9-3 and 9-4. Note, in order to simplify the description of the optical system, the aperture openings 8-1 and 8-2 of the iris diaphragm 8, the area sensors 11-1 and 11-2 of the photoelectric conversion unit 11, and the light flux 12-1 and 12-2, illustrated in FIG. 1, are not shown in FIG. 19.

Figure 20:
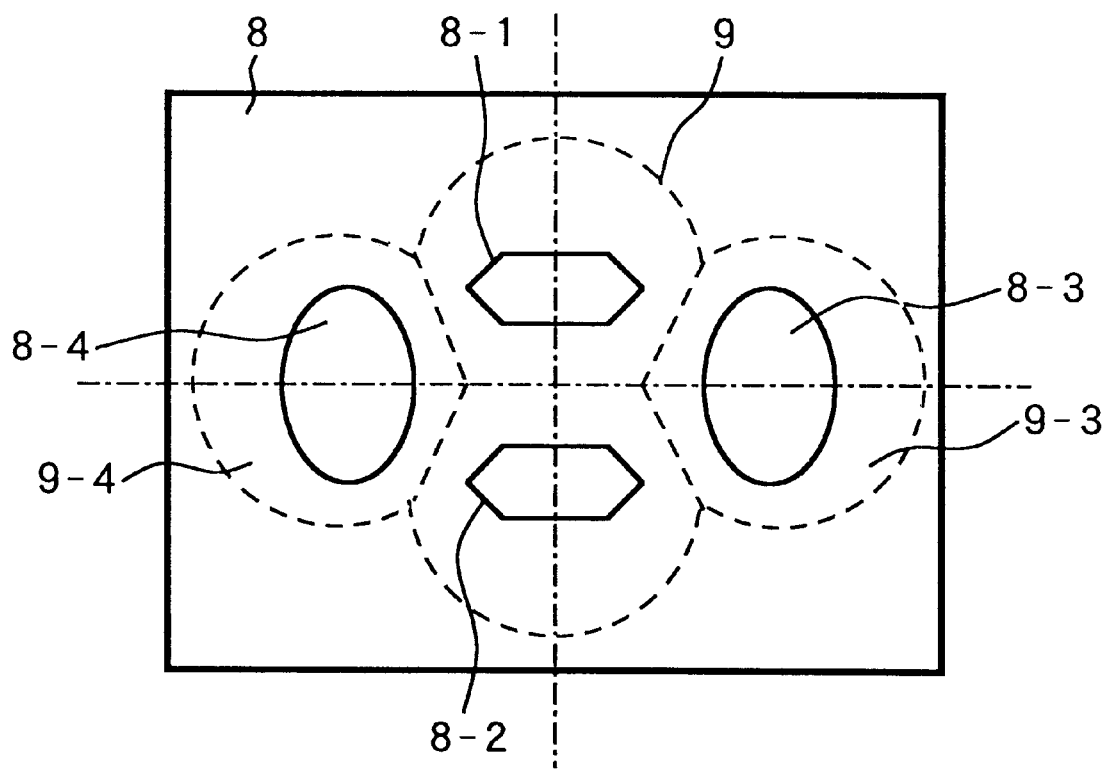
FIG. 20 is a view showing shapes of the aperture openings of the iris diaphragm 8 according to the eighth embodiment of the present invention.

FIG. 20 shows shapes of the aperture openings of the iris diaphragm 8 according to the eighth embodiment. In FIG. 20, reference numerals 8-3 and 8-4 indicate the added aperture openings (shown by solid lines), and 9-3 and 9-4 indicate two lenses (shown by broken lines) configuring a part of the secondary lens system 9 provided in correspondence to the aperture openings 8-3 and 8-4 and arranged behind them.

In the eighth embodiment, as shown in FIG. 20, the aperture openings 8-3 and 8-4 are set at a distance farther than the distance from the center of the iris diaphragm 8 to the aperture openings 8-1 and 8-2 so as to collect light passing through the periphery of the pupil of the object lens (not shown). By configuring as above, the length of, so-called, a base line can be extended upon focus state detection. Accordingly, the optical system, corresponding to the aperture openings 8-3 and 8-4 of the iris diaphragm 8, newly added in the eighth embodiment increases precision of the focus state detection when a bright lens (i.e., a lens having small f-number) is used as the object lens. Of course, the aperture openings 8-3 and 8-4 of the iris diaphragm 8 may be arranged at the same distance as the aperture openings 8-1 and 8-2 from the center of the iris diaphragm 8. With this arrangement, although precision of focus state detection does not specifically increase, it is possible to always detect focus state of an object whose luminance varies either in the vertical direction or in the horizontal direction, regardless of brightness of the object lens.

Figure 21:
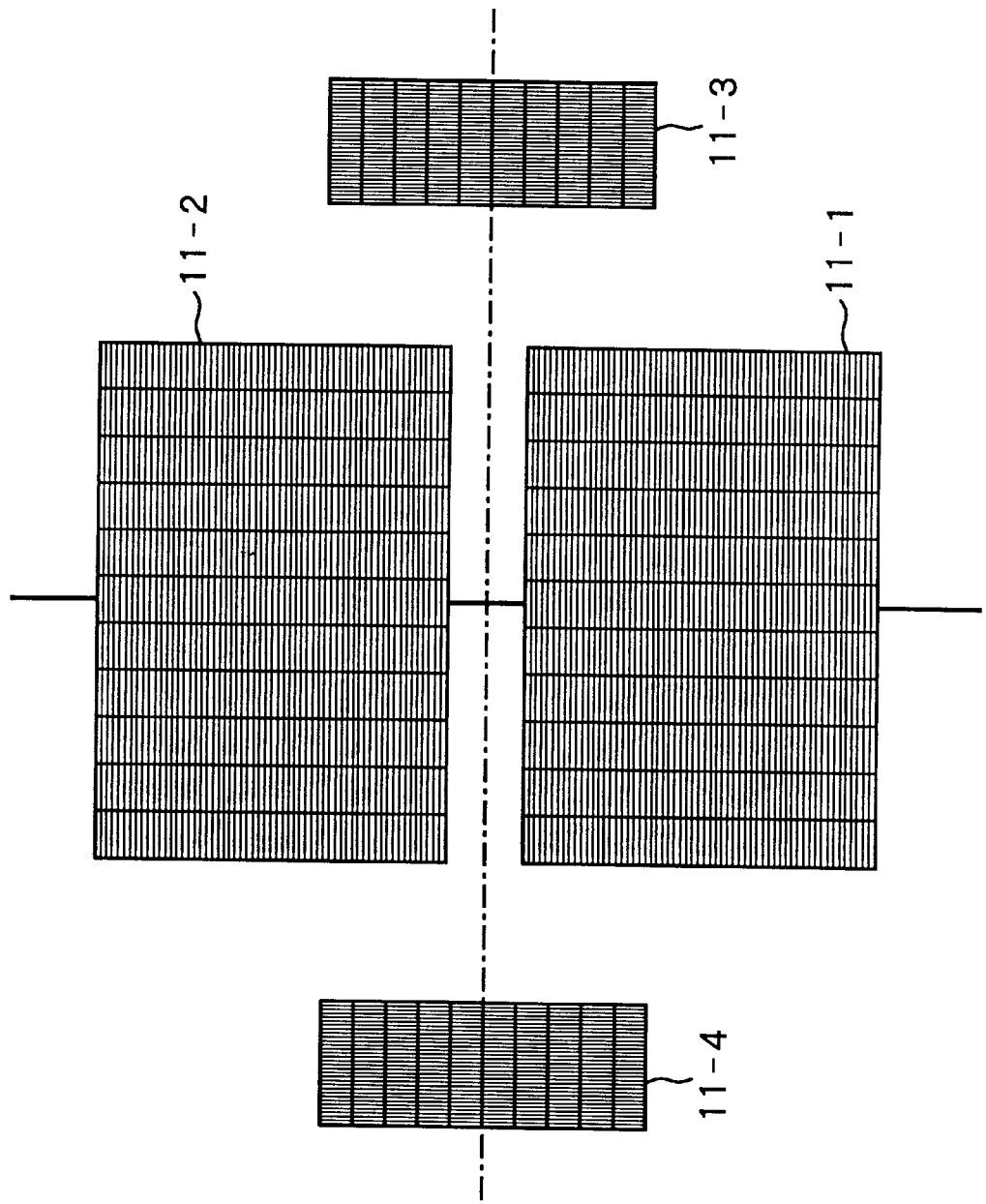
FIG. 21 a view briefly showing a photoelectric conversion unit according to the eighth embodiment of the present invention.

FIG. 21 shows an arrangement of the area sensors 11-3 and 11-4, corresponding to the lenses 9-3 and 9-4, of the photoelectric conversion unit 11 for obtaining distributions of quantity of light. As seen in FIG. 21, the visual fields corresponding to the area sensors 11-3 and 11-4 for detecting phase differences between images in the horizontal direction are set smaller than the visual fields of the area sensors 11-1 and 11-2 for detecting phase differences between images in the vertical direction. The reason for setting the sizes of the area sensors 11-1 to 11-4 small is to realize a secondary lens system causing less distortion of an image both in the vertical and horizontal directions and avoid increase in size of the photoelectric conversion unit.

Figure 38:
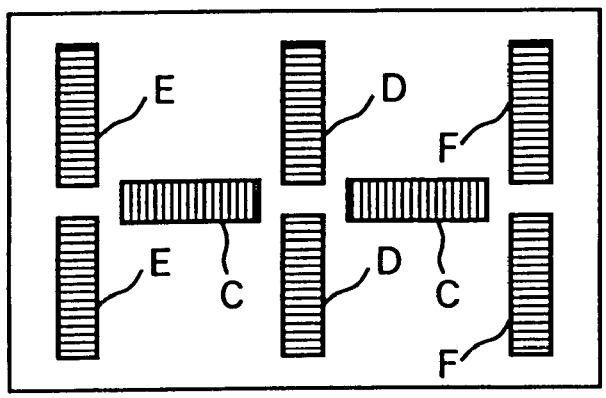
FIG. 38 is a view showing an arrangement of line sensors corresponding to the areas shown in FIG. 37.
Figure 39:
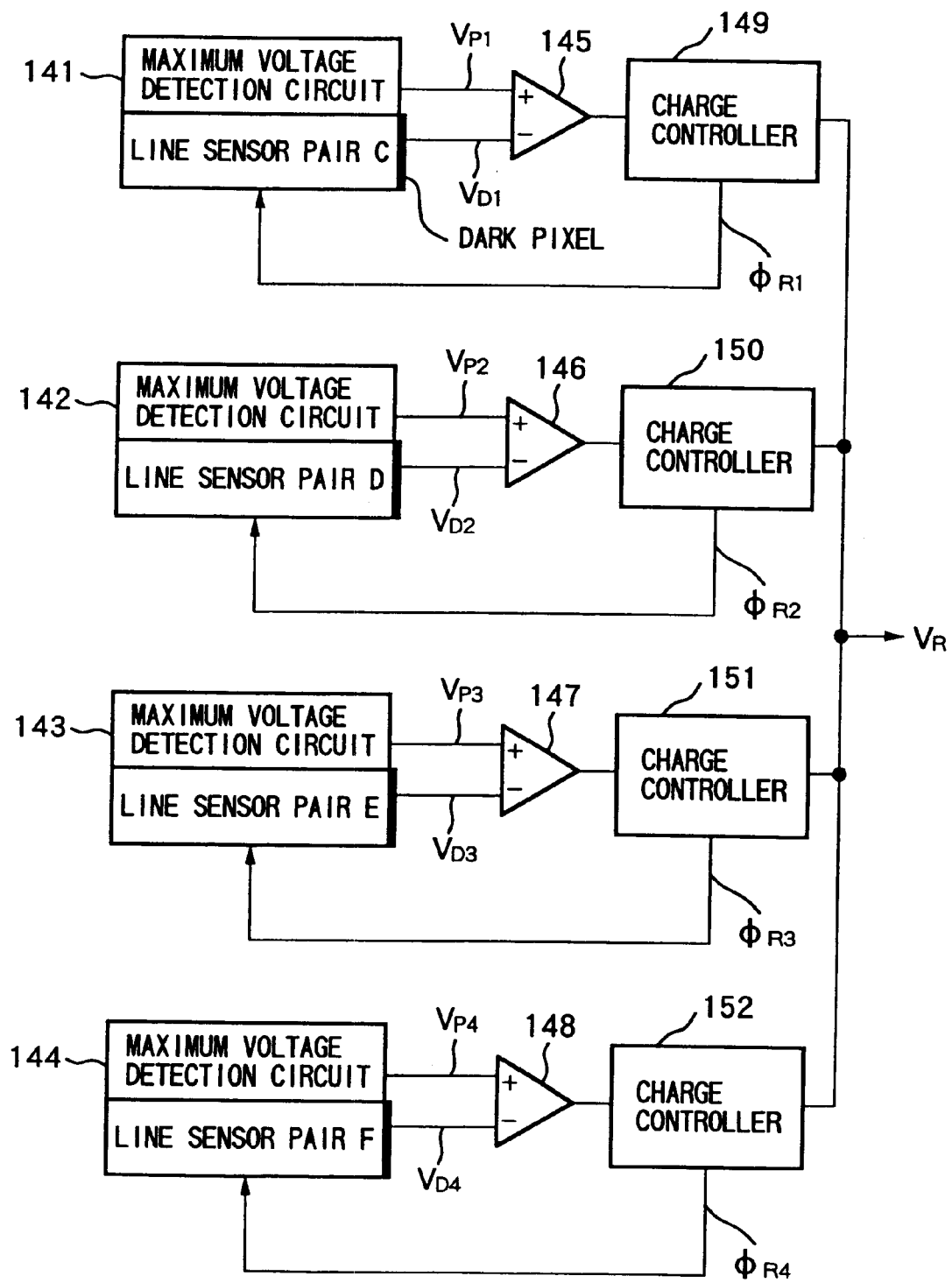
FIG. 39 is a block diagram illustrating a brief mechanism for conventional charge control.
Figure 40:
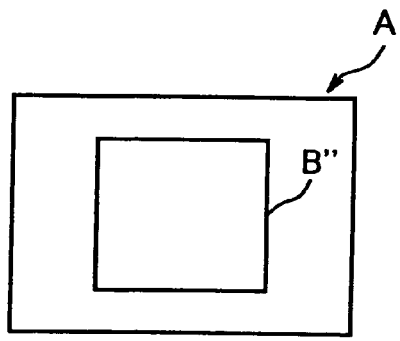
FIG. 40 is a view showing an area used for conventional focus state detection.
Figure 41:
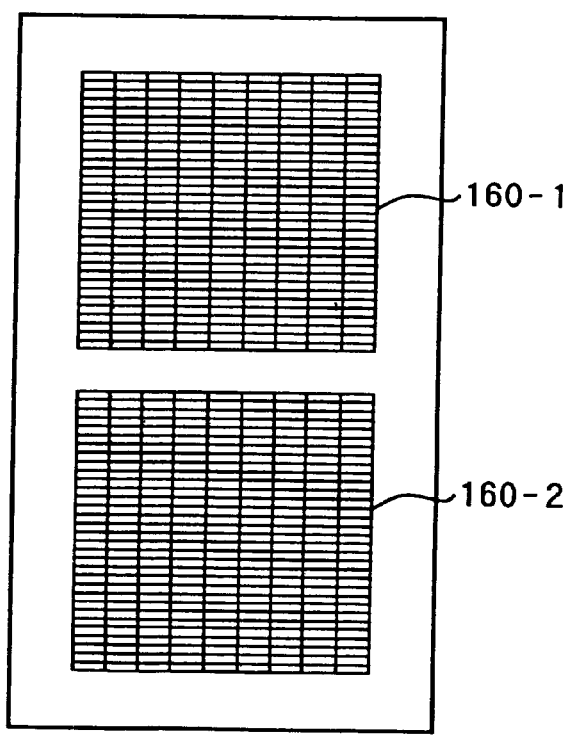
FIG. 41 is a view showing a pair of area sensors according to a prior art.
Figure 43A:
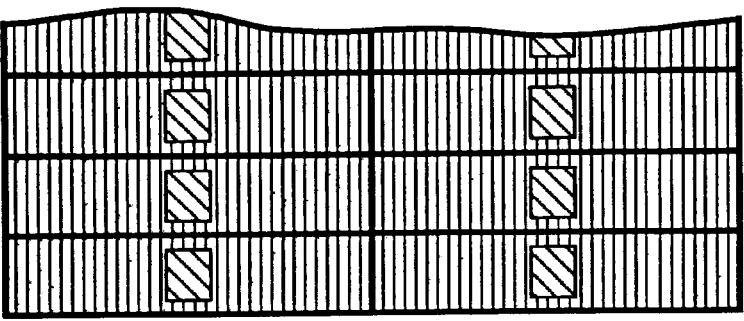
FIGS. 43A to 43C are views showing distributions of detection centers according to the prior art.
Figure 43B:
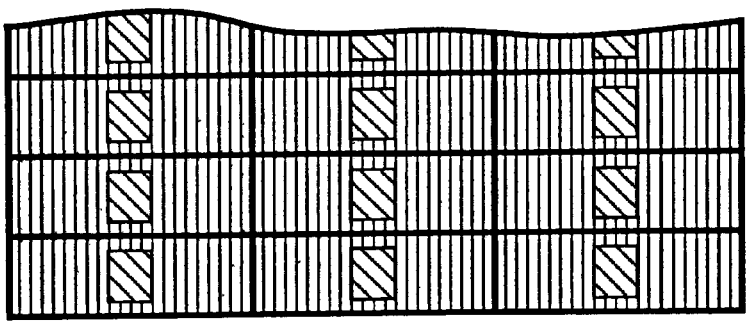
Figure 43C:
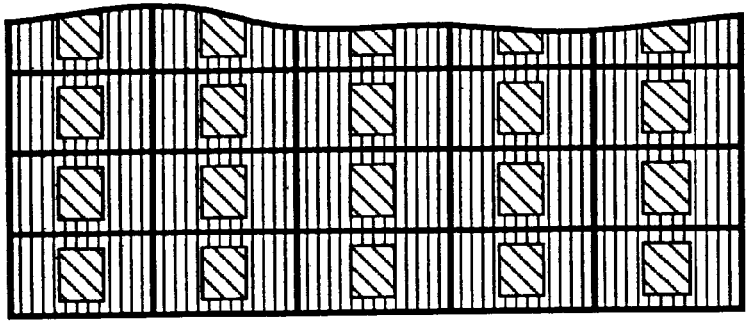
Figure 44:
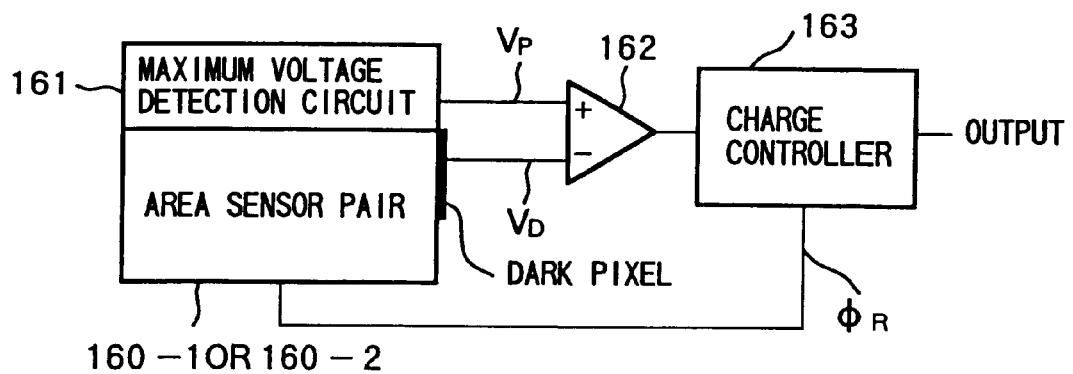
FIG. 44 is a block diagram illustrating a brief mechanism for conventional charge control.
Figure 45:
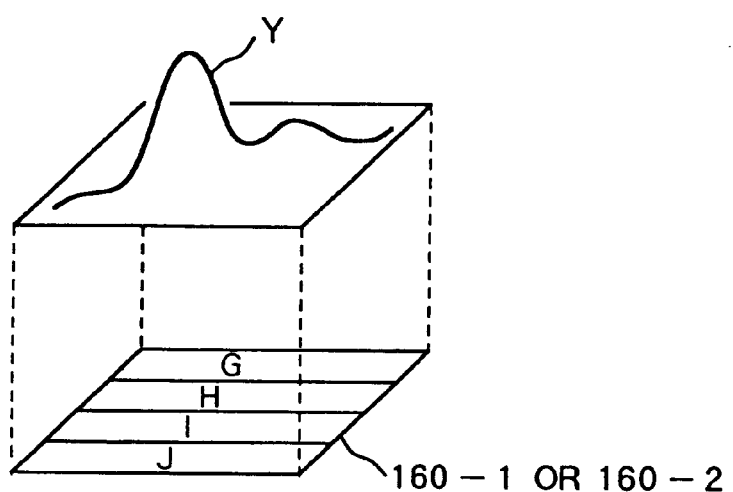
FIG. 45 is a view showing an image, as an image signal, on an area sensor according to the prior art.
Figure 46A:
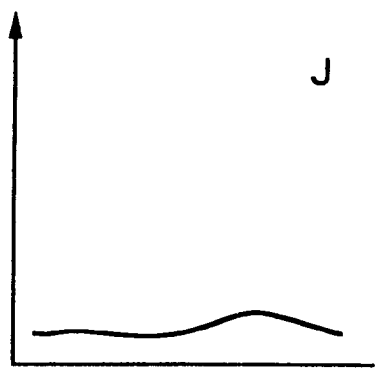
FIGS. 46A to 46D are graphs of image signals shown by each of divided areas obtained by area sensor according to the prior art.
Figure 46B:
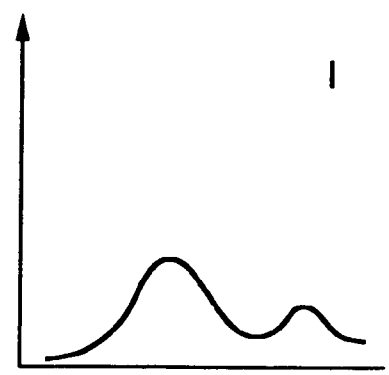
Figure 46C:
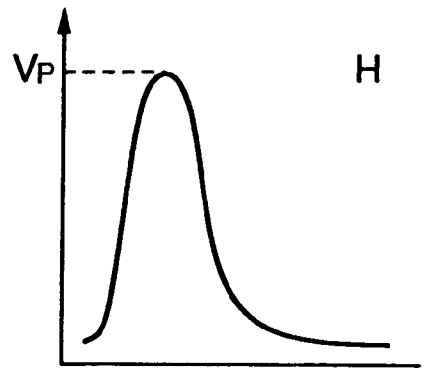
Figure 46D:
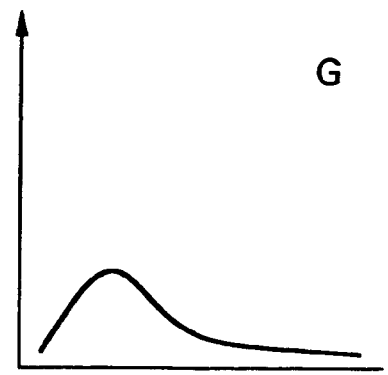

Charging control of the four area sensors 11-1 to 11-4 is performed by each divided area pair of the area sensors 11-1 and 11-2, and of the area sensors 11-3 and 11-4 on the basis of the maximum voltage in each divided area pair. In other words, charge control for the plural pairs of line sensors described with reference to in FIG. 38 is applied to the plural pairs of area sensors, and by detecting the maximum voltage in each divided area pair of the corresponding area sensors and obtaining the end-charging signal for each divided area pair, it is possible to obtain signals of proper level for focus state detection from the broad image sensing area.

Note, in the aforesaid embodiments, incoming light passing through the object lens is separated into two images having a parallax, then respective two separated images are formed on the respective area sensors, however, the present invention is not limited to this. For example, two images of an object incoming through two lenses separated at a predetermined base-line distance may be formed on the respective area sensors.

According to the embodiments as described above, in the focus state detection apparatus capable of performing focus state detection in a broad area of a continuous two-dimensional image sensing area or observation area, signals of proper level are obtained by each of a plurality of divided area pairs of a plurality of photoelectric conversion devices, as photo-receptors, which extend continuously in two dimensions, and charge control is performed independently for the respective divided areas. Accordingly, it is possible to focus on an object whose image is formed on any position in the area of two-dimensional photoelectric conversion devices easily and at high precision. Furthermore, according to the configuration as described above, the size of the control circuit is reduced, thereby a focus state detection apparatus can be provided at low price.

Ninth Embodiment

Next, a ninth embodiment of the present invention will be explained.

In the ninth embodiment, focus state detection apparatus having the same configuration as shown in FIGS. 1 to 3 is used, therefore, the explanation of it is omitted.

Figure 22:
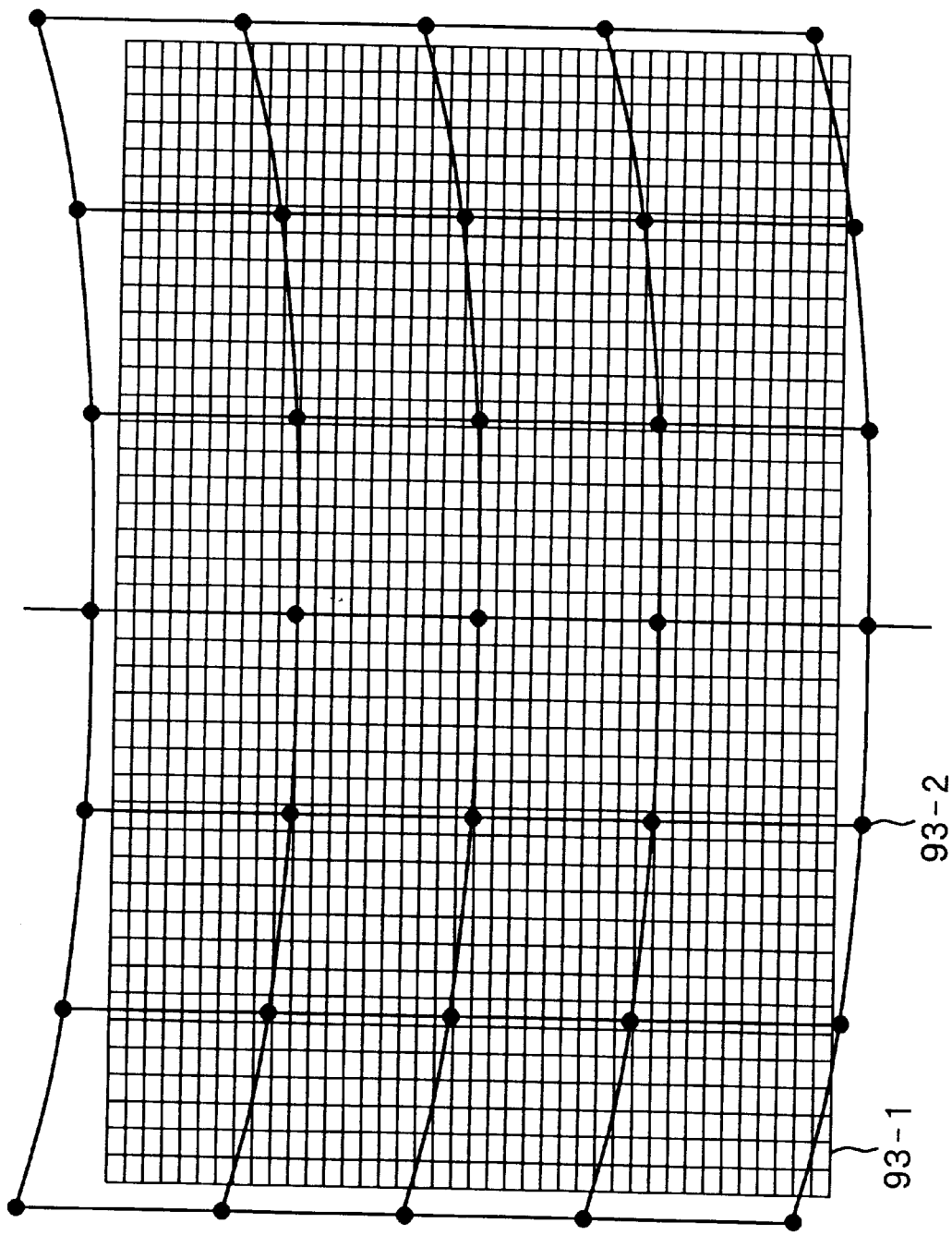
FIG. 22 is a view for explaining phase-in/phase-out.

FIG. 22 shows a case where each of the area sensors 11-1 and 11-2, shown in FIG. 3, is configured with a conventional area sensor. Reference numeral 93-1 denotes photoelectric conversion pixel array arranged in two dimension, and reference numeral 93-2 denotes a distorted image formed on the photoelectric conversion pixel array 93-1. The photoelectric conversion pixel array 93-1 has a flat rectangular shape, and pixels having a rectangular shape are arranged in the vertical and horizontal directions. The image 93-2 is distorted in a barrel shape while passing through the lens system.

As shown in FIG. 22, as an image formed on the photoelectric conversion device extends in two dimensions, the image is more distorted by spreading. As a result, especially in the periphery of the photoelectric conversion device, an image portion actually formed on an area portion of the photoelectric conversion device is different from an image portion supposed to be formed on the area portion. Further, a variation in precision of focus state detection caused by the phase-in/phase-out of the photoelectric conversion device and an image, which has been a conventional problem, can not be solved by using the conventional area sensors.

Figure 23:
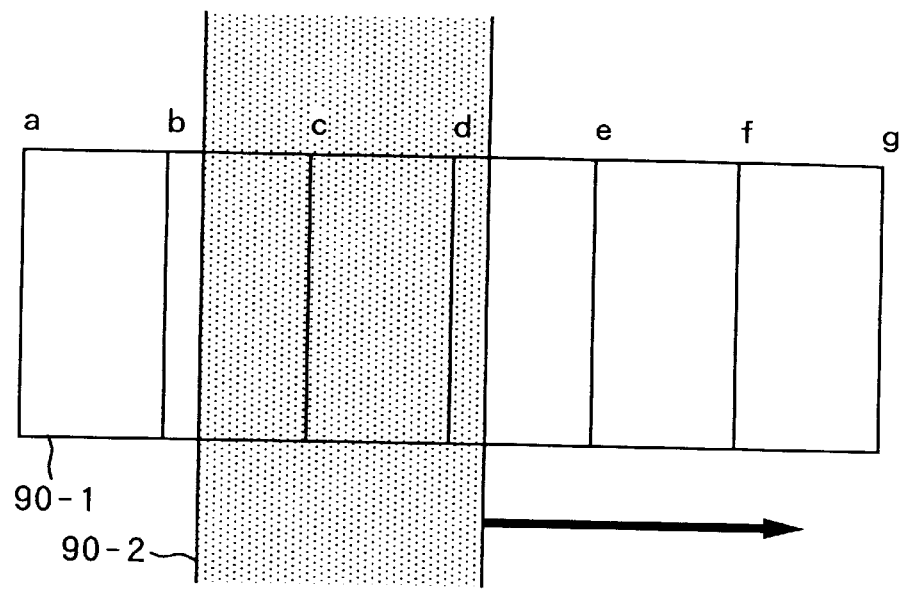
FIG. 23 is a view for explaining the phase-in/phase-out on the photoelectric conversion pixel array.
Figure 25:
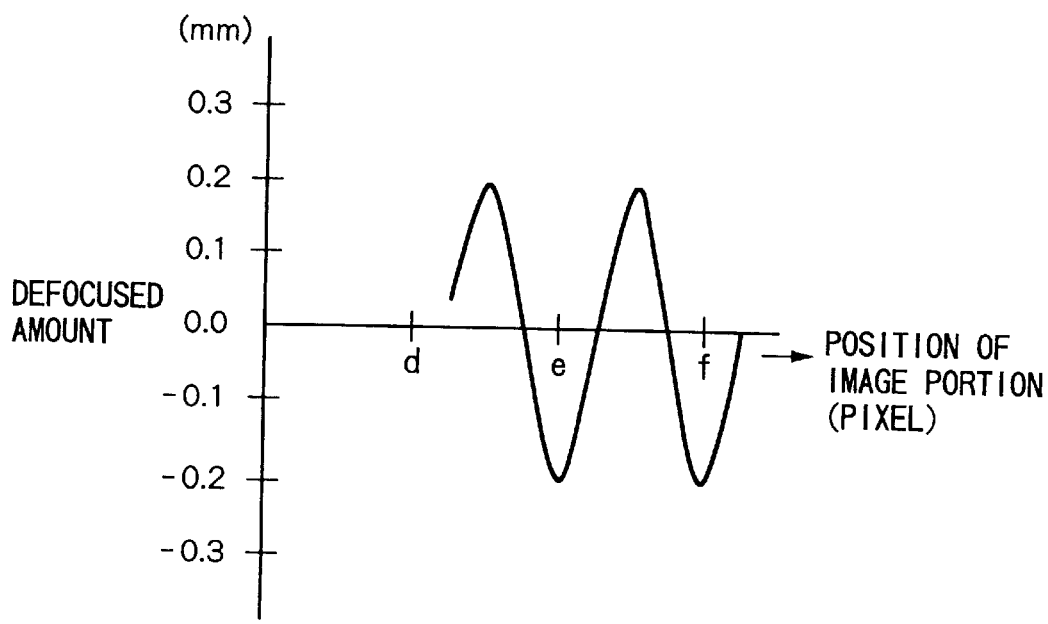
FIG. 25 is a graph of obtained defocus amount for explaining the phase-in/phase-out.

FIG. 23 is a view for explaining the phase-in/phase-out on the photoelectric conversion pixel array. In FIG. 23, reference numeral 90-1 denotes each pixel of the photoelectric conversion pixel array 93-1, and reference numeral 90-2 denotes a portion of an image formed on the photoelectric conversion pixel array 93-1. FIG. 25 is a graph showing a variation in precision of focus state detection caused by the phase-in/phase-out of the image formed on the photoelectric conversion pixel array 93-1. In the graph shown in FIG. 25, the abscissa shows the position of the image portion 90-2 when it is moved in the direction of an arrow shown in FIG. 23 and the ordinate shows a defocus amount. As seen in FIG. 25, the defocus amount caused by phase-in/phase-out of the image on the photoelectric conversion pixel array alters with a spatial period corresponding to the pixel-width of the photoelectric conversion pixel array.

Figure 24:
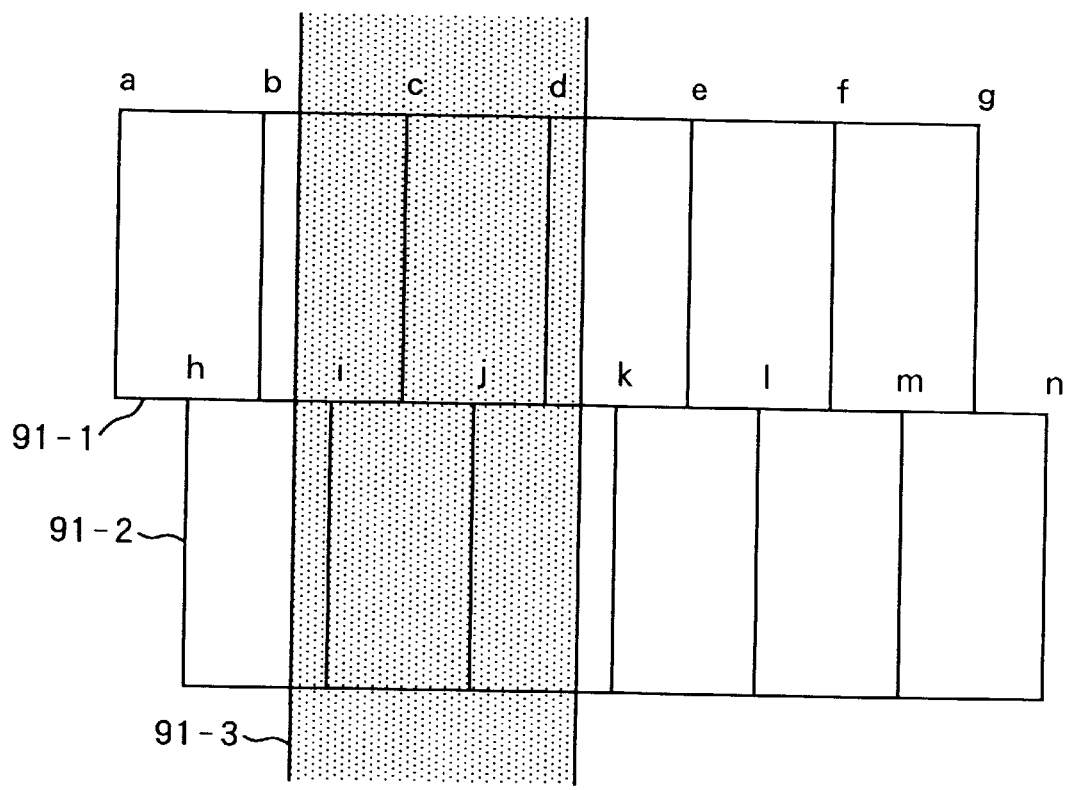
FIG. 24 is a view showing an arrangement of pixels.
Figure 26:
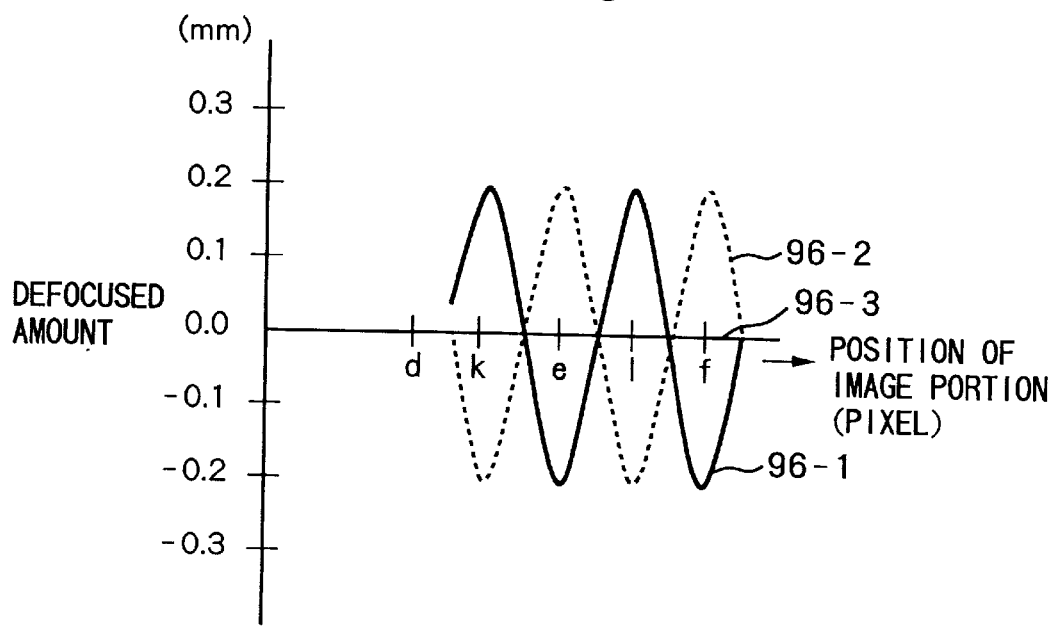
FIG. 26 is a graph of obtained defocus amount when pixels are arranged as shown in FIG. 24.

In order to improve the variation in the defocus amount caused by phase-in/phase-out and to stabilize precision for detecting defocus amount, pixels are conventionally arranged as shown in FIG. 24. In FIG. 24, a line of photoelectric conversion pixels a to g and another line of photoelectric conversion pixels h to n are shifted by ½ pixel. The detected result of defocus amount using these photoelectric conversion pixel lines is shown in FIG. 26. In this configuration, in addition to the defocus amount 96-1 obtained on the basis of the output from the photoelectric conversion pixels a to g expressed with a solid line which is the same as the defocus amount shown in FIG. 25, the defocus amount 96-2 is obtained on the basis of the output from the photoelectric conversion pixels h to n shown by a dotted line. By simply adding these defocus amounts at each position, the total defocus amounts becomes 0 (96-3), as shown by the line 96-3. Thus, in a method in which the photoelectric conversion pixel lines are shifted by a predetermined amount and a single defocused amount is obtained by adding defocused amounts obtained on the basis of outputs from pixels in adjoining two lines, it is confirmed theoretically and experimentally that, when the adjoining photoelectric conversion pixel lines are shifted by ½ pixels, the best result is obtained.

Technique for arranging adjoining photoelectric conversion pixel lines shifted by a predetermined amount has been proposed in many patent applications (e.g., Japanese Patent Application Laid-Open No. 59-105606), however, with regard to sensing an image extending in two dimensions, phase differences between signals obtained by adjoining photoelectric conversion pixel lines, arranged as shown in FIG. 24, do not always become a predetermined amount due to distortion of an image. In this case, problems are not corrected as expected.

Figure 27:
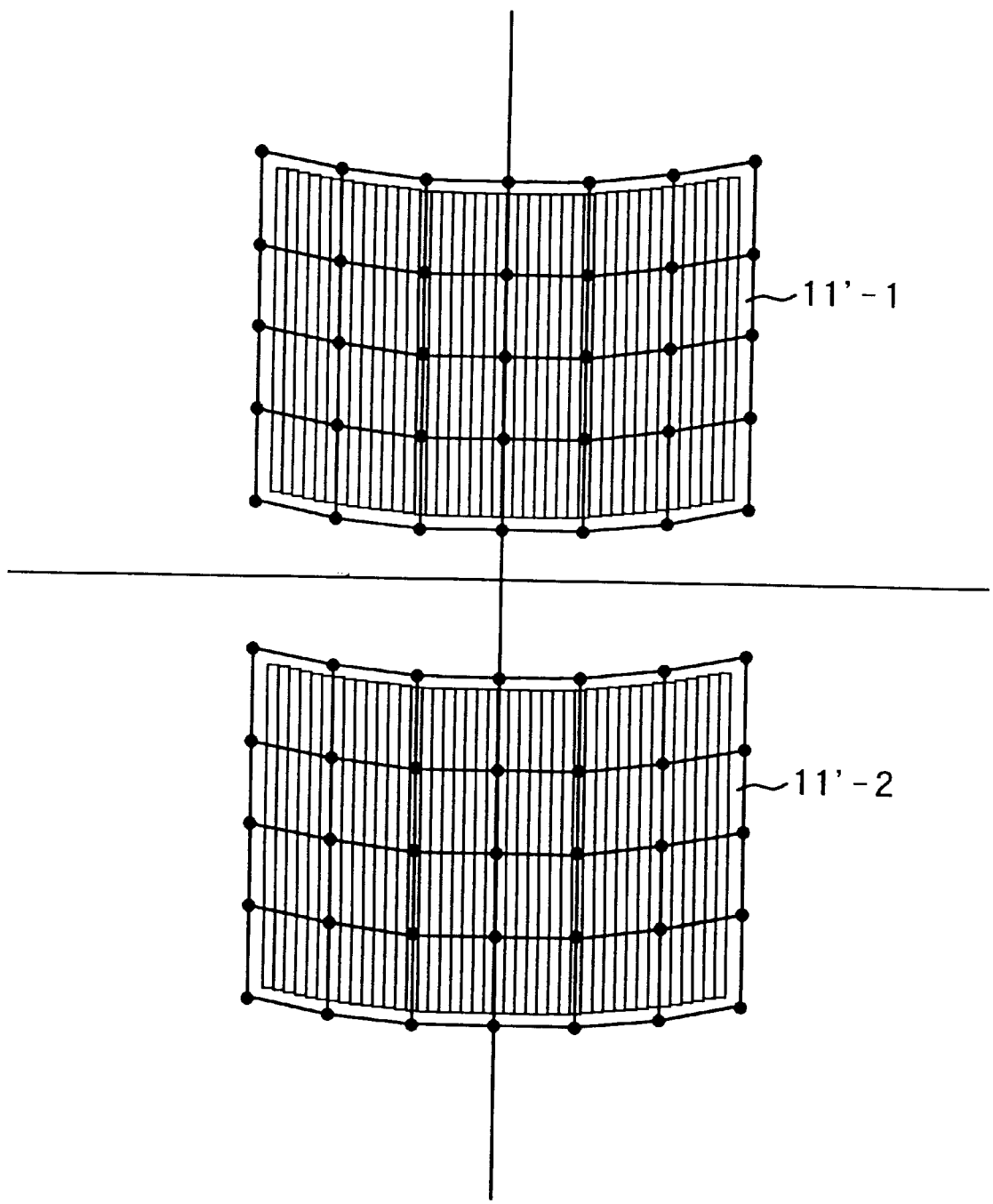
FIG. 27 is a view showing a brief configuration of a photoelectric conversion unit according to a ninth embodiment of the present invention.
Figure 28:
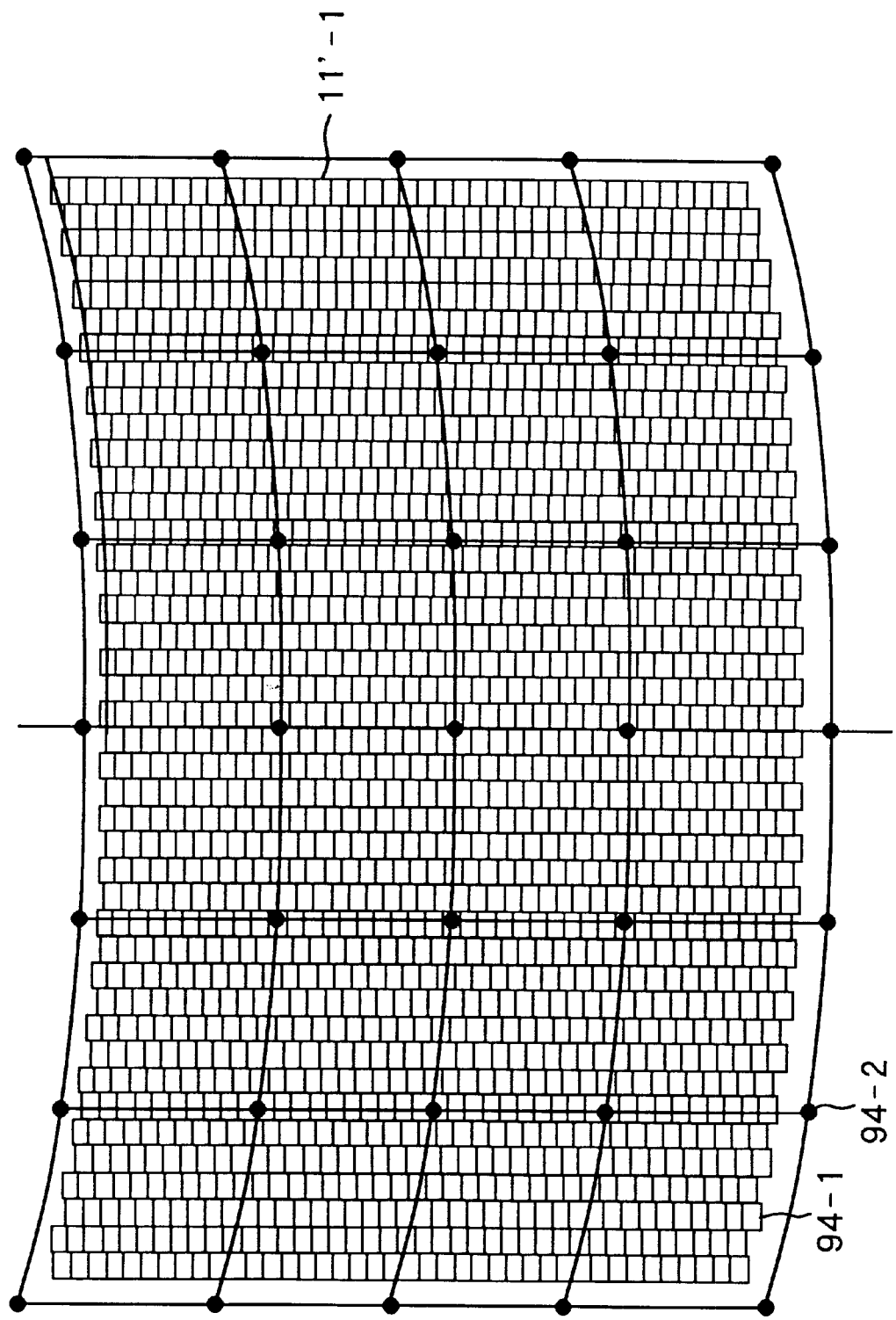
FIG. 28 is an enlarged view of a part of the photoelectric conversion unit according to the ninth embodiment of the present invention.
Figure 29:
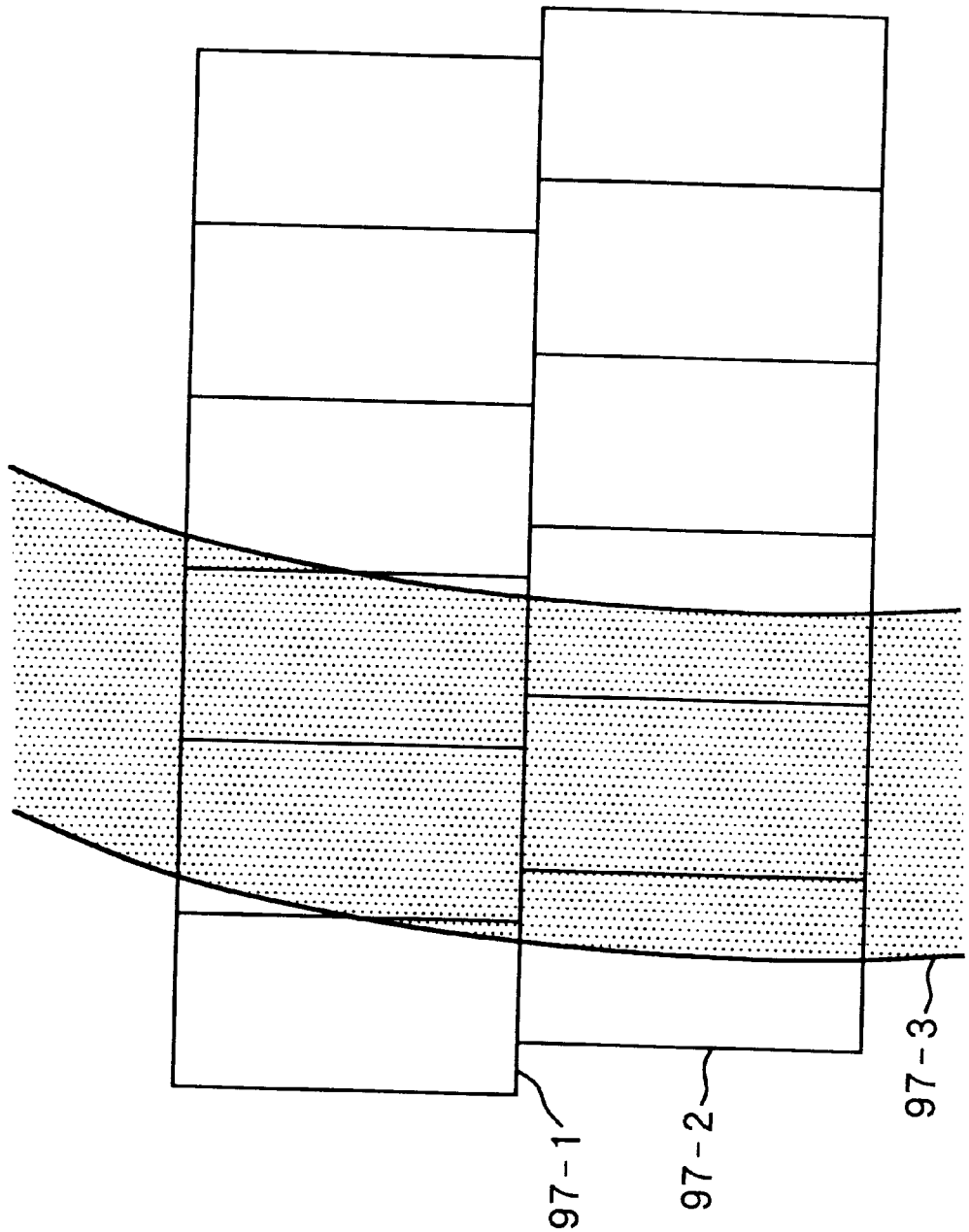
FIG. 29 is an enlarged view of a part of photoelectric conversion unit shown in FIG. 28 according to the ninth embodiment of the present invention.

The photoelectric conversion unit for overcoming the above problem is shown in FIG. 27, and a portion of the photoelectric conversion unit is shown in FIG. 28. In FIG. 28, reference numeral 94-1 denotes each photoelectric conversion pixel, and 94-2, a distorted image formed on the photoelectric conversion pixels. FIG. 29 shows the photoelectric conversion pixel lines which is an magnified view of the photoelectric conversion unit shown in FIG. 28. Referring to FIG. 29, photoelectric conversion pixel lines 97-1 and 97-2 are arranged so that the photoelectric conversion pixel lines 97-1 and 97-2 are shifted by ½ pixel with respect to an image 97-3 of the object expressed with oblique lines. In other words, phase difference between the photoelectric conversion pixel lines 97-1 and 97-2 is ½ pixel with respect to the image 97-3 even through the image 97-3 is distorted. Accordingly, the feature of the photoelectric conversion unit arranged as described above comparing to the arrangement shown in FIG. 24 is that the photoelectric conversion unit of the present invention has a plurality of pixel lines arranged so as to compensate for the distortion of the image of the object, and the phase of one line and the phase of the next line is shifted by ½ pixel with respect to the light flux from the object.

Therefore, in the ninth embodiment, neighboring photoelectric conversion pixel lines are arranged so that they are shifted by a predetermined amount ( ½ pixel in the ninth embodiment) with respect to the light flux from the object, and one defocus amount is obtained on the basis of two defocus amounts obtained on the basis of outputs from the neighboring photoelectric conversion pixel lines. Accordingly, even when the image sensing area to be used for focus state detection is broadened, it is possible to always perform stable focus state detection by preventing effects of a variation in defocus amount due to phase-in/phase-out problem.

By dividing the area sensors 11'-1 and 11'-2 (shown in FIG. 27), configured as described above, by five in the vertical direction and by eleven in the horizontal direction, divided areas corresponding to the detection centers distributes as shown in FIG. 4 are obtained. Further, by performing charge control independently by divided area pair of the area sensors, the same effect as described in the first embodiment can be obtained. In addition to the effect of the first embodiment, according to the ninth embodiment, the problem of the variation in detected defocus amount due to the phase-in/phase-out when performing focus state detection by using the area sensors is improved, thereby increasing the precision of the focus state detection.

Furthermore, it is also possible to control a part of the 55 divided area pairs of the area sensors 11'-1 and 11'-2 as described in the second to fifth embodiments. Further, the area sensors 11'-1 and 11'-2 may be divided as described in the sixth and seventh embodiments, or into other pattern. It is also possible to add the configuration as described in the eighth embodiment.

Tenth Embodiment

Figure 30:
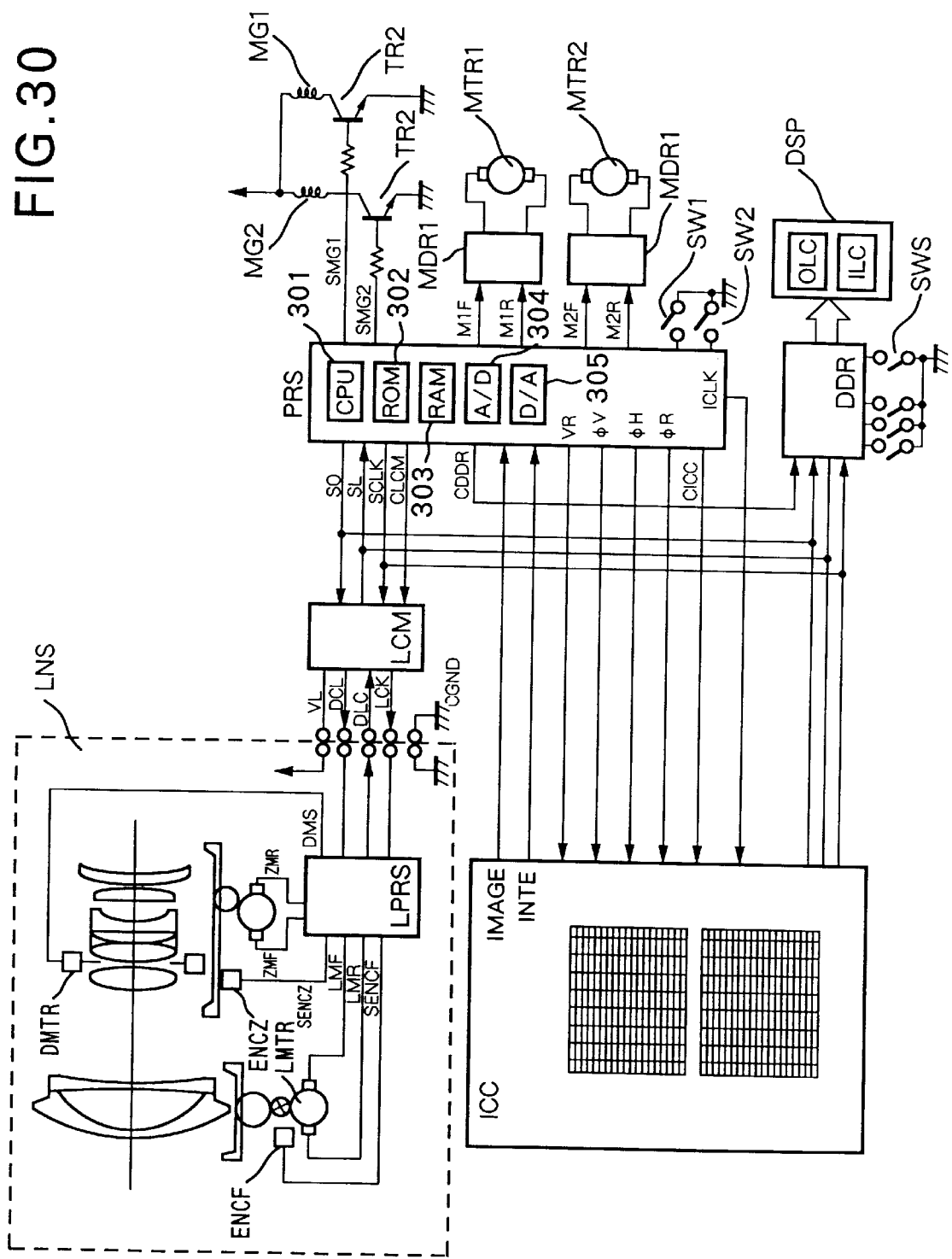
FIG. 30 is a diagram illustrating a brief configuration of a camera including a focus state detection apparatus described in one of the first to ninth embodiments.

FIG. 30 is a diagram illustrating a brief configuration of a camera including a focus state detection apparatus which is as described above.

In FIG. 30, reference PRS denotes a control unit which is, for instance, an one-chip microcomputer having a CPU 301, ROM 302, RAM 303, an analog-digital converter 304, and a digital-analog converter 305. The microcomputer PRS controls overall operation of the camera, such as automatic exposure control, automatic focusing adjustment, film advancing, film rewinding, etc., in accordance with sequence programs stored in the ROM 302. Thus, the microcomputer PRS communicates with inside circuits of the camera and a lens control unit by using communication signals SO, SI and SCLK, and communication selection signals CLCM, CDDR and CICC, to control operation of each circuit and lens.

Regarding communication signals, SO is a data signal outputted from the microcomputer PRS, SI is a data signal inputted to the microcomputer PRS, and SCLK is a synchronizing clock for signals SO and SI.

Further, in FIG. 30, reference LCM denotes a lens communication buffer circuit, and it supplies electric power to a power input terminal VL for lens when the camera is under operation, further, when the selection signal CLCM from the microcomputer PRS is in high potential level (referred as "H", and low potential level is referred as "L", hereinafter), it acts as a communication buffer between the microcomputer PRS and the lens.

When the microcomputer PRS controls the selection signal CLCM to be "H", and outputs predetermined data from as the data signal SO in synchronization with the synchronizing clock SCLK, the lens communication buffer circuit LCM outputs buffer signals LCK and DCL corresponding to the synchronizing clock SCLK and the data signal LO, respectively, to the lens via a communication node between the microcomputer PRS and the lens. At the same time, a buffer signal of the signal DLC is outputted from a lens unit LNS as the data signal SI, and the microcomputer PRS receives data of the lens as the data signal SI in synchronization with the synchronizing clock SCLK.

Reference DDR denotes a circuit for detecting operation of various switches SWS and for display. It is selected when the signal CDDR is "H", and controlled by the microcomputer PRS by using the data signals SO and SI, and the synchronizing clock SCLK. More specifically, the circuit DDR changes displayed contents on a display member DSP of the camera on the basis of data sent from the microcomputer PRS, and notifies the microcomputer PRS of the ON/OFF state of each of the operation switches SWS of the camera by communication. Reference OLC denotes an outside liquid crystal display provided in the upper portion of the camera, and reference ILC denotes a liquid crystal display inside of a finder. In the tenth embodiment, settings of an area used for the focus state detection is performed using the switches SWS connected to the circuit DDR for detection and display.

Switches SW1 and SW2 are coupled with a release button (not shown), and with a half press of the release button, the switch SW1 is turned on, and with a full press of the release button, the switch SW2 is turned on. The microcomputer PRS performs photometry and automatic focusing adjustment in response to the "on" operation of the switch SW1, and in response to the "on" operation of the switch SW2, it controls exposure, thereafter, advances the film a frame.

Note, the switch SW2 is connected to an interruption input terminal of the microcomputer PRS, and even when programs triggered by the "on" operation of the switch SW1 is under execution, the "on" operation of the switch SW2 interrupts the execution, and the microcomputer PRS swiftly moves to a predetermined interrupt program.

Reference MTR1 denotes a motor for advancing the film, and reference MTR2 denotes a motor for moving a mirror in the up and down direction and charging of a shutter spring, and the film and the mirror are controlled to move in the forward and reverse directions by the motors MDR1 and MDR2, respectively. Signals M1F, M1R, M2F and M2R, inputted from the microcomputer PRS to driving circuits MDR1 and MDR2, are forward and reverse rotation control signals.

References MG1 and MG2 denote front and rear shutter operation magnet, which is supplied with electric power via amplifying transistors TR1 and TR2 in response to control signals SMG1 and SMG2, and the shutter is controlled by the microcomputer PRS.

Note, the motor driving circuits MDR1 and MDR2 and shutter control are not directly related to the present invention, therefore, detailed explanation of them are omitted.

A buffer signal DCL which is inputted to the control circuit LPRS inside of the lens unit LNS in synchronization with the buffer signal LCK is instruction data from the microcomputer PRS to the lens unit LNS, and operation of the lens unit LNS corresponding to each instruction is predetermined. The control circuit LPRS inside of the lens unit LNS analyzes the instruction in a predetermined procedure, and outputs operation states of focusing control, iris diaphragm control, the output signal DLC, each element of the lens unit LNS (e.g., operation states of focusing control optical system and operation states of iris diaphragm), and various parameters (open f-number, focus distance, coefficient of amount of movement of focusing control optical system corresponding to defocus amount, various focus correction amounts, etc.)

A zoom lens is explained in the tenth embodiment as an example, and when an instruction of focusing adjustment is transmitted from the microcomputer PRS, a motor LMTR for focusing adjustment is operated on the basis of the signals LMF and LMR showing an amount and direction of displacement which are transmitted simultaneously. Accordingly, focusing adjustment is performed by either rotating the optical system in the forward or reverse direction along the optical axis. The amount of displacement of the optical system is obtained in the following manner. First, a pattern of a pulse board, which rotates, coupled with the optical system, is detected by a photocoupler, monitoring a pulse signal SENCF outputted from an encoder ENCF which outputs pulses whose number corresponds to the displacement amount, and the number of the pulses is counted by a counter provided inside of the control circuit LPRS inside of the lens unit LNS. When the front lens finishes moving by a calculated amount, then the control circuit LPRS inside of the lens unit LNS controls the signals LMF and LMR to "L" to operate the motor LMTR.

Therefore, after an instruction for focusing adjustment is transmitted from the microcomputer PRS, the microcomputer PRS does not care about operation of the lens until the lens finishes displaced. Further, the control circuit LPRS transmits the value of the counter to the microcomputer PRS when the microcomputer PRS requests to do so.

When an instruction for controlling the iris diaphragm is transmitted from the microcomputer PRS, a stepping motor DMTR which is known for driving an iris diaphragm is operated based on an iris diaphragm stage number transmitted at the same time. Note, since the stepping motor DMTR can control to open the iris diaphragm, an encoder for monitoring the operation is not necessary.

Reference ENCZ denotes an encoder attached to a zoom optical system, and the control circuit LPRS inside of the lens unit LNS detects the zoom position by receiving a signal SENCZ from the encoder ENCZ. The control circuit LPRS inside of the lens unit LNS stores lens parameters corresponding to respective zoom positions, and outputs a parameter corresponding to a current zoom position to the microcomputer PRS when the microcomputer PRS requests to do so.

Reference ICC denotes a focus state detection circuit, including area sensors, configured with CCDs which are photoelectric converters, etc., used for focus state detection and their operation control circuit. The focus state detection circuit ICC is selected when the selection signal CICC is "H", and controlled by the microcomputer PRS using the data signals SO and SI, and the synchronizing clock SCLK.

φV and φH are read signals for the area sensors, and φR is a reset signal. These sensor signals are generated by a driving circuit provided inside of the focus state detection circuit ICC on the basis of signals from the microcomputer PRS. The signals outputted from the area sensors are amplified, then inputted into an analog signal input terminal of the microcomputer PRS as output signals IMAGE. Thereafter, the microcomputer PRS converts the analog output signals IMAGE into digital signals, and the values of the digital signals are sequentially stored in the RAM at predetermined addresses. With these digitized signals, the focus state detection is performed.

Reference VR denotes a predetermined level, explained in the first embodiment, used for detecting timing for terminating charging operation and is common for all the differential amplifiers; INTE, a terminal for outputting an end-charging signal; and ICLK, a reference clock signal for the control circuits inside of the focus state detection circuit ICC.

In the aforesaid configuration of a camera, the focus state detection circuit ICC performs focus state detection by using area sensors, as described in the first to ninth embodiments, and the detected result is used in the control circuit LPRS inside of the lens unit LNS via the microcomputer PRS to move and fix the optical system to focus on a desired point. Thereafter, with the operation of the shutter button, a focused image can be photographed.

Note, in FIG. 13, the camera and lens unit LNS are separable (i.e., lens can be exchanged), however, the present invention is not limited to this, and the camera and lens may be configured integrally.

The present invention is not limited to the above embodiments and various changes and modifications can be made within the spirit and scope of the present invention. Therefore to appraise the public of the scope of the present invention, the following claims are made.

What is claimed is:

1. A focus state detection apparatus comprising:
   an image sensing portion having a plurality of pixels which extend in two dimensions and are divided into a plurality of areas in two dimension, each area including a plurality of pixels and said plurality of divided areas sensing different portions of an object;
   a common output unit for receiving signals from said plurality of divided areas;
   a plurality of switches for sequentially outputting the signals from said plurality of divided areas to said common output unit;
   a controller which independently controls charging of the divided areas of said image sensing portion by sequentially determining charging conditions of the divided areas on the basis of signals outputted from said common output unit; and a detector which detects a focus state on the basis of signals outputted from said image sensing portion after charging of said image sensing potion is finished under control of said controller.

2. The focus state detection apparatus according to claim 1, wherein each pixel of said image sensing portion has a rectangular shape, and said image sensing portion is divided into a plurality of strips along the shorter side of the rectangular pixels.

3. The focus state detection apparatus according to claim 1, wherein the signals outputted from said switches are maximum charge amount signals of said plurality of divided areas.

4. The focus state detection apparatus according to claim 1, wherein said controller sequentially determines time for stopping charging the divided areas.

5. The focus state detection apparatus according to claim 1, wherein said image sensing portion is designed so as to compensate for distortion of an image of the object caused by the optical system.

6. The focus state detection apparatus according to claim 5, wherein said focus state detection apparatus detects focus state by phase-difference detection method, and said plurality of pixels of said image sensing portion are arranged side by side in the direction that phases of the signals outputted from each of said plurality of divided areas of said image sensing portion are shifted, and have pixel arrays arranged in a stripe pattern in the direction which phases are shifted, and each pixel array is shifted from adjoining pixel arrays by one half pixel in the direction which the phases are shifted with respect to the image of the object.

7. The focus state detection apparatus according to claim 5, wherein said image sensing portion includes a plurality of pixel arrays whose pixels have a rectangular shape arranged in a stripe pattern, and each of pixel arrays is shifted from adjoining pixel arrays by one half pixel in the direction where the phases are shifted along the shorter side of the rectangular pixels.

8. A focus state detection apparatus which detects focus state of an object on the basis of signals obtained from light flux from the object passed through an optical system. said apparatus comprising:

a pair of image sensing regions each of which extends in two dimensions and is divided into a plurality of areas each of which is controlled independently;

control means for independently controlling charging of each pair of the corresponding divided areas of said pair of image sensing regions; and detection means for detecting focus state on the basis of signals outputted from each pair of divided areas of said pair of image sensing regions after charging of the pair of divided areas is finished under control of said control means;

wherein said focus state detection apparatus detects focus state by phase-difference detection method, and said pair of image sensing regions are arranged side by side in the direction that phases of the signals outputted from each pair of divided areas of said pair of image sensing regions are shifted, and said pair of image sensing regions are divided into a plurality of strips in the direction that the phases are shifted.

9. The focus state detection apparatus according to claim 8, wherein each of the plurality strips is further divided in the direction perpendicular to the direction of the strips.

10. The focus state detection apparatus according to claim 9, wherein each of the plurality of strips is further divided in the direction perpendicular to the direction of the strips so that central portions of respective divided areas are arranged in a check pattern.

11. The focus state detection apparatus according to claim 10, wherein one of the central portions is set on an optical axis of the optical system.

12. The focus state detection apparatus according to claim 10, wherein the central portions are arranged symmetrical with respect to top-to-bottom and right-to-left lines which intersect with the optical axis of the optical system.

13. The focus state detection apparatus according to claim 10, wherein the central portions are arranged at different intervals in the top-to-bottom direction from the right-to-left direction.

14. The focus state detection apparatus according to claim 13, wherein the interval between the central portions in the top-to-bottom direction is wider than the interval between the central portions in the right-to-left direction.

15. The focus state detection apparatus according to claim 13, wherein, the central portions are arranged at wider interval in one direction, in which phases of the signals outputted from each pair of divided areas of said pair of image sensing devices are shifted in a case where focus state is detected by performing phase-difference detection method, than the other direction.

16. The focus state detection apparatus according to claim 13, wherein the interval between the central portions in one direction is less than twice the interval between the central portions in the other direction.

17. The focus state detection apparatus according to claim 13, wherein a ratio of a number of the central portions in the top-to-bottom direction to a number of the central portions in the right-to-left direction is the same as a ratio of a length of top-to-bottom side to a length of right-to-left side of an image.

18. The focus state detection apparatus according to claim 13, wherein relationship between the interval of the central portions in the top-to-bottom direction and the interval of the central portions in the right-to-left direction is the same as relationship between a length of top-to-bottom side and a length of right-to-left side of an image.

19. The focus state detection apparatus according to claim 13, wherein the intervals between the central portions in the top-to-bottom direction and in the right-to-left direction are the same.

20. The focus state detection apparatus according to claim 8 further comprising a pair of image sensing regions each of which extends in two dimensions and divided into a plurality of areas in the direction perpendicular to the strips.

21. A focus state detection apparatus which detects focus state of an object on the basis of signals obtained from light flux from the object passed through an optical system. said apparatus comprising:

a pair of image sensing regions each of which extends in two dimensions and is divided into a plurality of areas each of which is controlled independently.

control means for independently controlling charging of each pair of the corresponding divided areas of said pair of image sensing regions; and detection means for detecting focus state on the basis of signals outputted from each pair of divided areas of said pair of image sensing regions after charging of the pair of divided areas is finished under control of said control means;

wherein said control means individually controls to stop charging all the pixels in each pair of divided areas on the basis of a maximum charge amount in the pair of divided areas;

wherein said pair of image sensing regions includes a plurality of reference signal output units for outputting reference signals for the respective pair of divided areas, and said control means has a judgement means for comparing a difference between the maximum charge amount in each pair of divided areas and the reference signal outputted from said corresponding reference signal output unit, to a predetermined value, and judging whether or not the difference is equal or greater than the predetermined value.

22. The focus state detection apparatus according to claim 21, wherein said control means further comprises the same number of maximum value detection circuits as the pairs of divided areas for detecting the maximum charge amounts in the respective pairs of divided areas, and said judgment means has the same number of differential amplifier as the pairs of divided areas for detecting differences between the maximum charge amounts of the respective pairs of divided areas outputted from said maximum value detection circuits and the corresponding reference signals, and comparison means for sequentially comparing the differences detected by said differential amplifiers to the predetermined value.

23. The focus state detection apparatus according to claim 21, wherein, when said judgment means judges that the difference between the maximum charge amount in one of the pairs of divided areas and the corresponding reference signal is equal or greater than the predetermined value, said control means controls to stop charging the pair of divided areas.

24. The focus state detection apparatus according to claim 23, wherein said judgment means performs judgment on a pair or pairs of divided areas selected in advance.

25. The focus state detection apparatus according to claim 24, wherein said focus state detection apparatus detects focus state by performing phase-difference detection method, said pairs of image sensing regions are arranged side by side in the direction in which phases of the signals outputted from each pair of divided areas of said pair of image sensing regions are shifted, and said pair of image sensing regions are divided into a plurality of strips in the direction in which the phases are shifted, and the pair or pairs of divided areas selected in advance is the pair or pairs of strips.

26. The focus state detection apparatus according to claim 21, wherein said control means prohibits a plurality of predetermined pairs of divided areas to output signals.

27. The focus state detection apparatus according to claim 26, wherein the predetermined pairs of divided areas are set by row in the right-to-left direction.

28. An image sensing apparatus including a focus state detection comprising:
- an image sensing portion having a plurality of pixels which extend in two dimensions and are divided into a plurality of areas in two dimensions, each including a plurality of pixels and said plurality of divided areas sensing different portions of an object;
- a common output unit for receiving signals from said plurality of divided areas; and
- a plurality of switches for sequentially outputting signals from said plurality of divided areas to said common output unit;
- a controller which independently controls charging of the divided areas of said image sensing portion by sequentially determining charging conditions of the divided areas on the basis of signals outputted from said common output unit; and
- a detector which detects the focus state on the basis of signals outputted from said image sensing portion after charging of said image sensing portion is finished under control of said control means.

29. The image sensing apparatus according to claim 28, wherein the signals outputted from said switches are maximum charge amount signals of said plurality of divided areas.

30. The image sensing apparatus according to claim 28, wherein said control means prohibits a plurality of predetermined pairs of divided areas to output signals.

31. The image sensing apparatus according to claim 28, wherein said pair of image sensing devices are designed so as to compensate for distortion of an image of the object caused by the optical system.

32. A photoelectric conversion apparatus comprising:
- an image sensing portion having a plurality of pixels which extend in two dimensions and are divided into a plurality of areas in two dimensions, each including a plurality of pixels and said plurality of divided areas sensing different portions of an object;
- a common output unit for receiving signals from said plurality of divided areas; and
- a plurality of switches for sequentially outputting signals from said plurality of divided areas to said common output unit; and
- a controller which independently controls charging of the divided areas of said image sensing portion by sequentially determining charging conditions of the divided areas on the basis of signals outputted from said common output unit.

33. The photoelectric conversion apparatus according to claim 32, wherein the signals outputted from said switches are maximum charge amount signals of said plurality of divided areas.

34. The photoelectric conversion apparatus according to claim 33, wherein when the difference between a maximum charge amount signal of one of the divided areas is greater than a predetermined value, said common output unit outputs a signal indicative of the maximum charge amount signal larger than the predetermined value, and said controller controls to stop charging the corresponding divided areas.

35. The photoelectric conversion apparatus according to claim 34, wherein said controller prohibits a plurality of predetermined divided areas to output signals.

36. The photoelectric conversion apparatus according to claim 35, wherein the predetermined divided areas are set by row in the right-to-left direction.

37. The photoelectric conversion apparatus according to claim 32, wherein said controller sequentially determines time for stopping charging the divided areas.

38. The photoelectric conversion apparatus according to claim 32, wherein said image sensing device are designed so as to compensate for distortion of an image of the object caused by the optical system.

39. The photoelectric conversion apparatus according to claim 38, wherein said image sensing device includes a plurality of pixel arrays whose pixels have a rectangular shape arranged in a stripe pattern, and each of pixel arrays is shifted from adjoining pixel arrays by one half pixel in the direction where the phases are shifted along the shorter side of the rectangular pixels.

40. A focus state detection apparatus which detects the focus state of an object on the basis of signals obtained from light flux from the object passed through an optical system, said apparatus comprising:

a pair of image sensing regions each including a plurality of pixels extending in two dimensions and divided into a plurality of areas which are controlled independently;

a charging controller that independently controls charging of each pair of the corresponding divided areas of said pair of image sensing regions; and a voltage detection circuit that detects the focus state on the basis of signals outputted from each pair of divided areas of said pair of image sensing regions after charging of the pair of divided areas is finished under control of said charging controller;

wherein said focus state detection apparatus detects the focus state by phase- difference detection method, and said pair of image sensing regions are arranged side by side in the direction that phases of the signals outputted from each pair of divided areas of said pair of image sensing regions are shifted, and said pair of image sensing regions are divided into a plurality of strips in the direction that the phases are shifted.

41. The focus state detection apparatus according to claim 40, wherein each of the plurality strips is further divided in the direction perpendicular to the direction of the strips.

42. The focus state detection apparatus according to claim 41, wherein each of the plurality of strips is further divided in the direction perpendicular to the direction of the strips so that central portions of respective divided areas are arranged in a check pattern.

43. The focus state detection apparatus according to claim 42, wherein one of the central portions is set on an optical axis of the optical system.

44. The focus state detection apparatus according to claim 42, wherein the central portions are arranged symmetrical with respect to the top-to-bottom and right-to-left lines which intersect with the optical axis of the optical system.

45. The focus state detection apparatus according to claim 42, wherein the central portions are arranged at different intervals in the top-to-bottom direction from the right to left direction.

46. The focus state detection apparatus according to claim 45, wherein the interval between the central portions in the top-to-bottom direction is wider than the interval between the central portions in the right-to-left direction.

47. The focus state detection apparatus according to claim 45, wherein, the central portions are arranged at wider interval in one direction, in which phases of the signals outputted from each pair of divided areas of said pair of image sensing devices are shifted in a case where focus state is detected by performing phase-difference detection method, than the other direction.

48. The focus state detection apparatus according to claim 45, wherein the interval between the central portions in one direction is less than twice the interval between the central portions in the other direction.

49. The focus state detection apparatus according to claim 45, wherein a ratio of a number of the central portions in the top-to-bottom direction to a number of the central portions in the right-to-left direction is the same as a ratio of a length of top-to-bottom side to a length of right-to-left side of an image.

50. The focus state detection apparatus according to claim 45, wherein relationship between the interval of the central portions in the top-to-bottom direction and the interval of the central portions in the right-to-left direction is the same as relationship between a length of top-to-bottom side and a length of right-to-left side of an image.

51. The focus state detection apparatus according to claim 45, wherein the intervals between the central portions in the top-to-bottom direction and in the right-to-left direction are the same.

52. The focus state detection apparatus according to claim 40 further comprising a pair of image sensing regions each of which extends in two dimensions and divided into a plurality of areas in the direction perpendicular to the strips.

53. A focus state detection apparatus which detects the focus state of an object on the basis of signals obtained from light flux from the object passed through an optical system, said apparatus comprising:

a pair of image sensing regions each including a plurality of pixels extending in two dimensions and divided into a plurality of areas which are controlled independently;

a charging controller that independently controls charging of each pair of the corresponding divided areas of said pair of image sensing regions; and at least one voltage detection circuit that detects the focus state on the basis of signals outputted from each pair of divided areas of said pair of image sensing regions after charging of the pair of divided areas is finished under control of said charging controller;

wherein said charging controller individually controls to stop charging all the pixels in each pair of divided areas on the basis of a maximum charge amount in the pair of divided areas;

wherein said pair of image sensing regions includes a plurality of reference signal output units for outputting reference signals for the respective pair of divided areas, and a differential amplifier that compares a difference between the maximum charge amount in each pair of divided areas and the reference signal outputted from said corresponding reference signal output unit, to a predetermined value, and judging whether or not the difference is equal or greater than the predetermined value.

54. The focus state detection apparatus according to claim 53, wherein the number of said maximum voltage detection circuits is the same as the number of pairs of divided areas for detecting the maximum charge amounts in the respective pairs of divided areas, and the number of said differential amplifier is the same as the number as the pairs of divided areas for detecting differences between the maximum charge amounts of the respective pairs of divided areas outputted from said maximum voltage detection circuits and the corresponding reference signals, and a comparator that sequentially compares the differences detected by said differential amplifiers to the predetermined value.

55. The focus state detection apparatus according to claim 53, wherein, when said judgment means judges that the difference between the maximum charge amount in one of the pairs of divided areas and the corresponding reference signal is equal or greater than the predetermined value, said control means controls to stop charging the pair of divided areas.

56. The focus state detection apparatus according to claim 55, wherein said judgment means performs judgment on a pair of pairs of divided areas selected in advance.

57. The focus state detection apparatus according to claim 56, wherein said focus state detection apparatus detects focus state by performing phase-difference detection method, said pairs of image sensing regions are arranged side by side in the direction in which phases of the signals outputted from each pair of divided areas of said pair of image sensing regions are shifted, and said pair of image sensing regions are divided into a plurality of strips in the direction in which the phases are shifted, and the pair or pairs of divided areas selected in advance is the pair or pairs of strips.

58. The focus state detection apparatus according to claim 53, wherein said charge controller prohibits a plurality of predetermined pairs of divided areas to output signals.

59. The focus state detection apparatus according to claim 58, wherein the predetermined pairs of divided areas are set by row in the right-to-left directions.

* * * * *

UNITED STATES PATENT AND TRADEMARK OFFICE
CERTIFICATE OF CORRECTION

PATENT NO.     : 6,577,344 B2
DATED          : June 10, 2003
INVENTOR(S)    : Terutake Kadohara et al.

It is certified that error appears in the above-identified patent and that said Letters Patent is hereby corrected as shown below:

<u>Title page,</u>
Item [*] Notice, add:
-- This patent issued on a continued prosecution application filed under 37 CFR 1.53(d), and is subject to the twenty year patent term provisions of 35 U.S.C. 154(a)(2). --

<u>Column 28,</u>
Line 5, "A fccus state" should read -- A focus state --

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO. : 6,577,344 B2
DATED : June 10, 2003
INVENTOR(S) : Terutake Kadohara et al.

It is certified that error appears in the above-identified patent and that said Letters Patent is hereby corrected as shown below:

<u>Title page,</u>
Item [56], References Cited, FOREIGN PATENT DOCUMENTS,
"EP 02001697" should read -- JP 2-001697 --;
"EP 03053210" should read -- JP 3-053210 --; and
"EP 04316007" should read -- JP 4-316007 --.

Signed and Sealed this

Sixth Day of April, 2004

JON W. DUDAS
*Acting Director of the United States Patent and Trademark Office*